(12) United States Patent  
Tanaka

(10) Patent No.: US 10,493,884 B2  
(45) Date of Patent: Dec. 3, 2019

(54) CONVEYANCE SEAT

(71) Applicant: TOYOTA BOSHOKU KABUSHIKI KAISHA, Aichi (JP)

(72) Inventor: Ryusuke Tanaka, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 37 days.

(21) Appl. No.: 15/660,314

(22) Filed: Jul. 26, 2017

(65) Prior Publication Data

US 2018/0037147 A1 Feb. 8, 2018

(30) Foreign Application Priority Data

Aug. 3, 2016 (JP) ................................ 2016-153044  
Aug. 5, 2016 (JP) ................................ 2016-154689

(51) Int. Cl.
  *B60N 2/68* (2006.01)
  *B60N 2/06* (2006.01)
  *B60N 2/20* (2006.01)

(52) U.S. Cl.
  CPC .................. *B60N 2/68* (2013.01); *B60N 2/06* (2013.01); *B60N 2/20* (2013.01)

(58) Field of Classification Search
  CPC combination set(s) only.
  See application file for complete search history.

(56) References Cited

U.S. PATENT DOCUMENTS

| 5,673,972 | A | * | 10/1997 | Dudash | B60N 2/20 |
| | | | | | 297/378.12 |
| 5,741,046 | A | * | 4/1998 | Leuchtmann | B60N 2/366 |
| | | | | | 297/378.1 |
| 2009/0051202 | A1 | | 2/2009 | Ozeki et al. | |
| 2016/0107553 | A1 | * | 4/2016 | Imajo | B60N 2/68 |
| | | | | | 297/452.18 X |

FOREIGN PATENT DOCUMENTS

JP 2006-341700 12/2006

* cited by examiner

*Primary Examiner* — Anthony D Barfield  
(74) *Attorney, Agent, or Firm* — Greenblum & Bernstein, P.L.C.

(57) ABSTRACT

Provided is a conveyance seat. The conveyance seat comprises: a seatback frame that constitutes a seatback; a bracket that is configured to support an operation lever provided on an upper end side of the seatback; an operation cable that transmits operation of the operation lever; and a routing restricting portion that is provided in at least one of the bracket and an upper panel portion and restricts a routing direction of the operation cable.

18 Claims, 17 Drawing Sheets

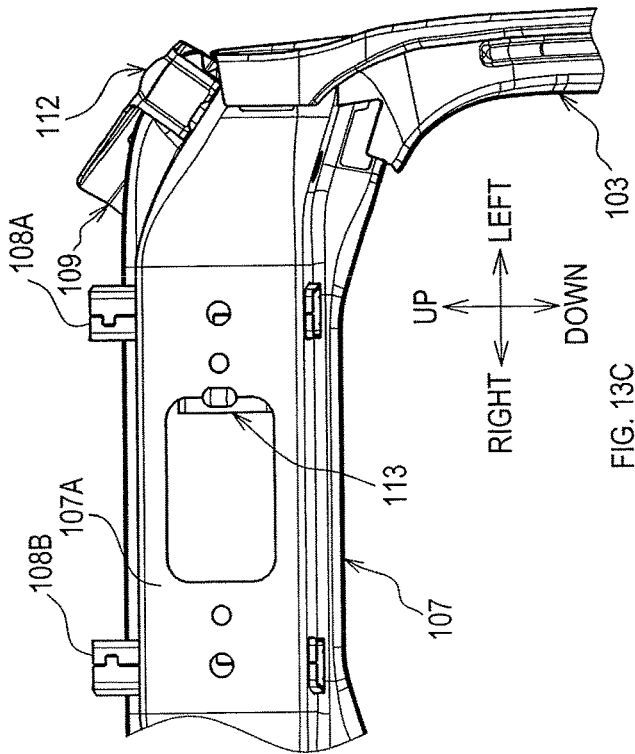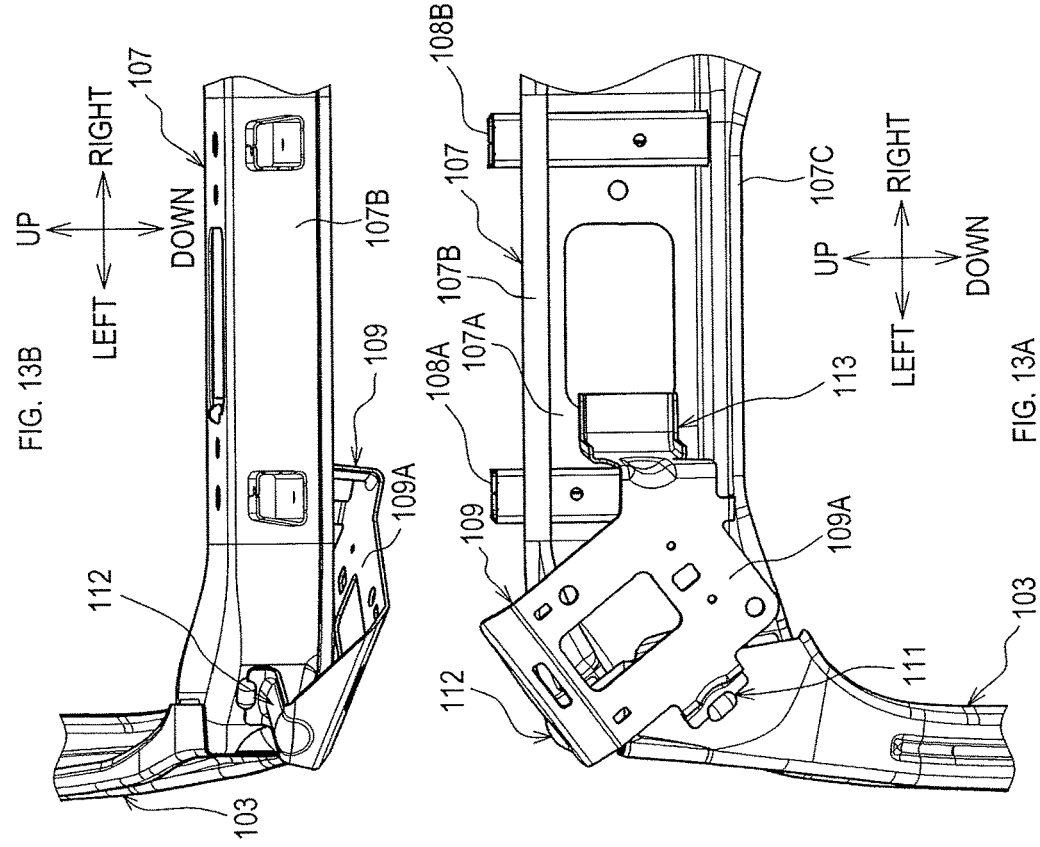

CONVEYANCE SEAT

CROSS-REFERENCE TO RELATED APPLICATIONS

This application claims the benefit of Japanese Patent Application No. 2016-154689 filed on Aug. 5, 2016 and No. 2016-153044 filed on Aug. 3, 2016 with the Japan Patent Office, the entire disclosures of which are incorporated herein by reference.

BACKGROUND

The present disclosure relates to a conveyance seat for use in a conveyance such as of a car, a railroad vehicle, a ship, and an airplane.

For example, a conveyance seat disclosed in Japanese Unexamined Patent Application Publication No. 2006-341700 has a "walk-in slide function", and a "walk-in mechanism" to realize the function. The walk-in slide function is a "function to make a seat cushion slidable in a seat front-rear direction in conjunction with an operation to allow a seatback to tilt to a seat front side". An operation lever to operate the walk-in mechanism is provided on an upper end side of the seatback. Operation of the seatback is transmitted to the walk-in mechanism via an operation cable.

SUMMARY

In the conveyance seat provided with the operation lever on the upper end side of the seatback, a lever bracket is fixed to a first direction side of a width direction of the seat of an upper end side of a seatback frame. The lever bracket is a bracket to support the operation lever.

The seatback frame is a gate-shaped rigid-frame structure that constitutes the seatback. In the recent seatback frame (hereinafter, referred to as a panel type seatback frame), two side frame portions, a panel-like upper panel portion, and the like constitute the gate-shaped rigid-frame structure.

In the conventional seatback frame (hereinafter, a pipe type seatback frame), two side frame portions, a pipe-shaped upper pipe portion, and the like constitute the gate-shaped rigid-frame structure. The term "rigid-frame structure" refers to a structure in which a bending stress against a bending moment is generated at a joining portion between members.

Since the panel type seatback frame is different from the pipe type seatback frame in structure, it is difficult to make a routing structure of the operation cable similar to that of the pipe type seatback frame.

In one aspect of the present disclosure, it is preferable that a conveyance seat comprising a panel type seatback frame is provided with an operation cable.

Further, an operation force of the operation lever acts on the lever bracket. However, since the panel type seatback frame is different from the pipe type seatback frame in structure, it is difficult to make a fixing structure of the lever bracket similar to that of the pipe type seatback frame.

In one aspect of the present disclosure, it is preferable that a conveyance seat comprising a panel type seatback frame is provided with a lever bracket.

The present disclosure provides a conveyance seat comprising: a seatback frame that constitutes a seatback; a bracket that is configured to support an operation lever provided on an upper end side of the seatback; an operation cable that transmits operation of the operation lever; and a routing restricting portion that is provided at least one of the bracket and the upper panel portion and restricts a routing direction of the operation cable. The seatback frame comprises: two side frame portions provided to face each other in a seat width direction and extending in a substantially up-down direction; and an upper panel portion that extends in the seat width direction to join respective upper end sides of the two side frame portions and provided with a panel portion substantially orthogonal to a seat front-rear direction. The bracket is fixed to the seatback frame. The operation cable passes through an end portion of the bracket or an end portion of the upper panel portion to be routed outside a space provided between the bracket and the upper panel portion from the space.

When an operation force acts on the operation cable, the operation cable may be moved and get caught in the space between the bracket and the upper panel portion. When the operation cable gets caught in the space, operation of the operation cable may be hindered.

In the present disclosure, however, the routing restricting portion is provided to restrict the routing direction of the operation cable. Therefore, the operation cable can be inhibited from getting caught in the space between the bracket and the upper panel portion. Accordingly, the operation cable can be reliably operated.

The present disclosure may be configured as follows.

For example, the routing restricting portion may restrict the routing direction along at least one of the seat width direction and the up-down direction.

The routing restricting portion may comprise a first restricting portion that restricts the routing direction along the seat width direction, and a second restricting portion that restricts the routing direction along the up-down direction. Further, the bracket and the upper panel portion may be able to restrict the routing direction of the seat front-rear direction.

The routing restricting portion may comprise an extending portion extending from the end portion of the bracket to a side of the upper panel portion. Thus, the routing restricting portion can be easily provided.

Also, the present disclosure provides a conveyance seat comprising: a seatback frame that constitutes a seatback, an operation lever provided on an upper end side of the seatback, and a lever bracket that is fixed to the seatback frame at least via a first fixing portion, a second fixing portion, and a third fixing portion. The seatback frame comprises two side frame portions provided to face each other in a seat width direction and extending in a substantially up-down direction, and a panel-like upper panel portion extending in the seat width direction to join respective upper end sides of the two side frame portions. The lever bracket receives an operation force acting on the operation lever. The first fixing portion and the second fixing portion are provided on a first direction side in the seat width direction on the upper end side of the seatback frame. Further, the third fixing portion is provided closer to a second direction side in the seat width direction than the first fixing portion and the second fixing portion in the upper panel portion.

Thus, the lever bracket according to the present disclosure can distribute the operation force to at least three portions. Accordingly, in the present disclosure, a conveyance seat can be provided which can exhibit sufficient rigidity against the operation force.

The present disclosure may be configured as follows.

For example, the two side frame portions may comprise a first side frame portion that is provided on the first direction side in the seat width direction, and a second side frame portion that is provided on the second direction side in the seat width direction. The conveyance seat may comprise a first joining portion that joins the first side frame portion and the upper panel portion, and a second joining portion that joins the second side frame portion and the upper panel portion. Further, the first fixing portion may be provided in the first side frame portion, and the second fixing portion may be provided on the first direction side in the seat width direction of the upper panel portion.

Thus, the lever bracket is fixed to the seatback frame so as to bridge the first side frame portion and the upper panel portion. Since the lever bracket functions as a reinforcing member, joining strength between the first side frame portion and the upper panel portion can be enhanced. Further the lever bracket can be firmly fixed to the seatback frame.

The upper panel portion may have a panel shape that comprises a first face portion substantially orthogonal to the seat front-rear direction and a second face portion substantially orthogonal to the up-down direction. Also, the conveyance seat may comprise two support brackets fixed to the upper panel portion to support a headrest. The two support brackets are spaced apart in the seat width direction. The two support brackets may be configured to have a tubular shape that extends in the substantially up-down direction. Further, the third fixing portion may be positioned between the two support brackets in the first face portion. Thus, the third fixing portion can be fixed to the first face portion by means of a fixing method such as welding.

The third fixing portion may comprise a extending portion extending from the lever bracket toward the first face portion, and a leg portion fixed to the first face portion. The extending portion may comprise a substantially plate-shaped plate-like portion, a concave or convex bead portion provided in the plate-like portion, and a flange portion provided at an end portion of the plate-like portion and projecting in a direction substantially orthogonal to the plate-like portion. Further, the bead portion may be provided on a side of the lever bracket, and the flange portion may be provided on a side of the leg portion. Since this can enhance rigidity of the third fixing portion, the lever bracket can be firmly fixed to the seatback frame.

The bead portion may be provided in a range from the lever bracket to positions corresponding to the support brackets. The flange portion may be provided in a range at least from the positions corresponding to the support brackets to the side of the leg portion. This can enhance rigidity of the third fixing portion while avoiding interference between the bead portion and the support brackets.

At least one of the first fixing portion and the second fixing portion may comprise an extending portion extending toward the seatback frame, the extending portion being provided with a concave or convex bead portion. This can enhance rigidity of at least one of the first fixing portion and the second fixing portion.

BRIEF DESCRIPTION OF THE DRAWINGS

An example embodiment of the present disclosure will be described hereinafter by way of example with reference to the accompanying drawings, in which:

FIG. 13A is a rear view of the seatback frame according to the third embodiment;

FIG. 13B is a top view of third the seatback frame according to the third embodiment;

FIG. 13C is a front view of the seatback frame according to the third embodiment;

DETAILED DESCRIPTION OF THE PREFERRED EMBODIMENTS

Figure 1:
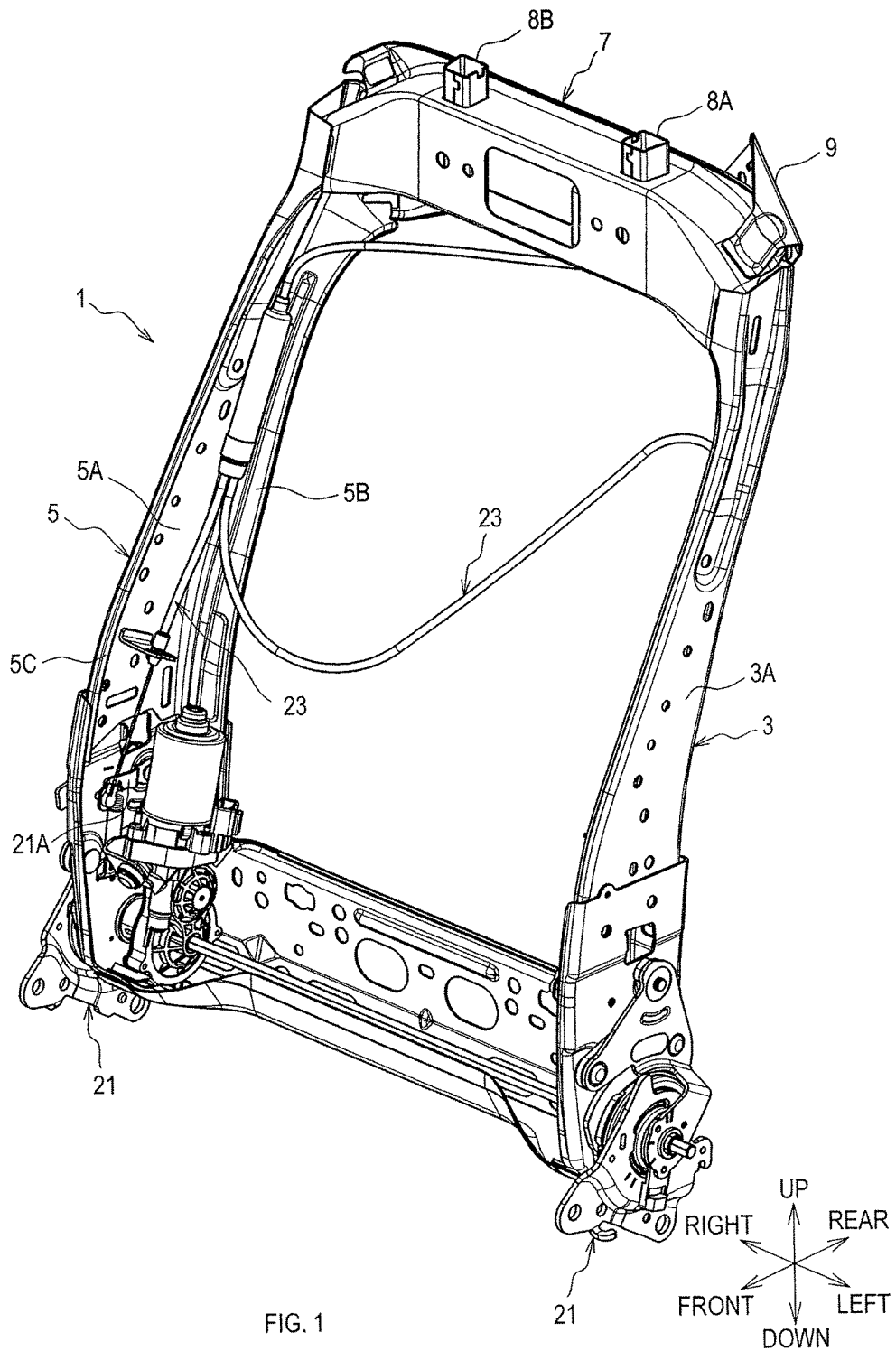
FIG. 1 is a front side perspective view of a seatback frame according to a first embodiment.

Each "embodiment" described below shows an example of an embodiment within the technical scope of the present disclosure. In other words, matters specifying the invention recited in the claims are not limited to the specific configurations, structures, etc. shown in the following embodiments.

Arrows and the like are provided to indicate directions attached to the respective figures, in order to make it easy to understand mutual relationships between the respective figures. Arrows and the like (directions) attached to each figure do not limit the scope of the present disclosure.

At least one member or portion is provided for at least a member or portion explained with a reference numeral, unless the member or portion is explicitly limited to be "one" member or portion, or the like. In other words, two or more such members may be provided.

[First Embodiment]

In the present embodiment, an explanation will be made on a seat in the second row on an entrance side of a minivan having three-row independent seats, or a front passenger seat of an ordinary passenger car. Directions in the following explanation indicate directions in a state in which a conveyance seat according to the present embodiment is assembled to the vehicle.

1. Outline of Conveyance Seat

Figure 2:
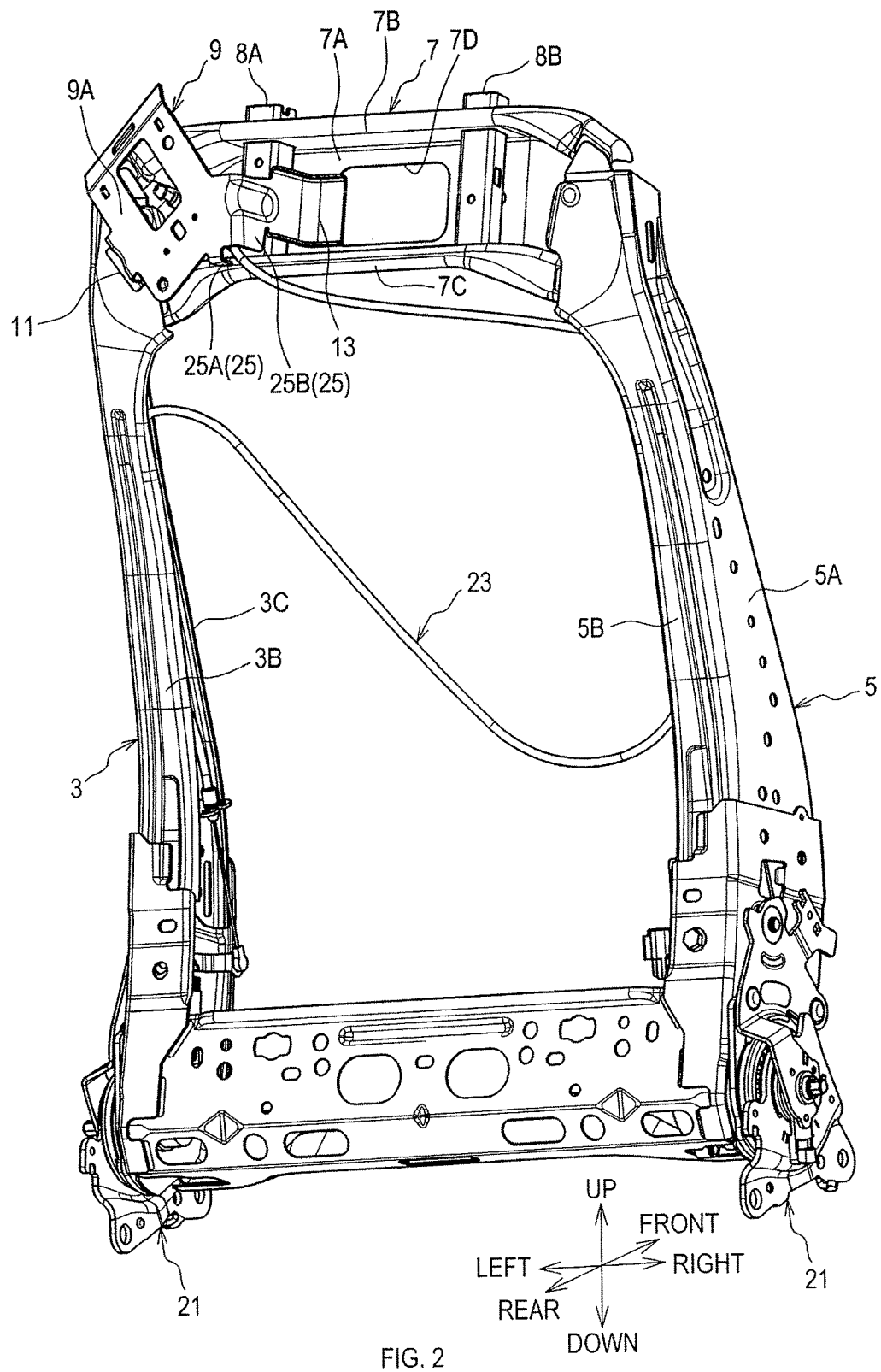
FIG. 2 is a rear side perspective view of the seatback frame according to the first embodiment.

As shown in FIGS. 1 and 2, a seatback frame 1 of a conveyance seat according to the present embodiment is a panel type seatback frame configured with a gate-shaped rigid-frame structure. The seatback frame 1 constitutes a seatback of the conveyance seat.

The seatback is a backrest part that supports the back of a seat occupant. The seatback frame 1 is covered by a cushion pad portion (not shown) and a skin portion (not shown).

The cushion pad portion is a member to absorb an impact force. The cushion pad portion is made of material, such as foamed urethane, that deforms to absorb an impact force. The skin portion is a member to cover the cushion pad portion. The skin portion is made of leather or synthetic leather, for example.

The seatback frame 1 comprises two side frame portions 3, 5, and an upper panel portion 7. The two side frame portions 3, 5 are frames that extend in a substantially up-down direction, and are arranged to face each other in a seat width direction. The seat width direction coincides with a left-right direction of a vehicle in the present embodiment.

Hereinafter, one of the two side frame portions 3, 5 that is arranged on a first direction (in the present embodiment, a left end) side of the seat width direction is referred to as a first side frame portion 3. The other of the two side frame portions 3, 5 that is arranged on a second direction (in the present embodiment, a right end) side of the seat width direction is referred to as a second side frame portion 5.

The first side frame portion 3 and the second side frame portion 5 are panel members, which are substantially symmetrical to each other in the seat width direction, and have a C-like open sectional shape orthogonal to an extending direction thereof.

In particular, the two side frame portions 3, 5 respectively have side surface portions 3A, 5A and flange portions 3B, 3C, 5B, 5C, as shown in FIGS. 1 and 2. The side surface portions 3A, 5A constitute a first surface portion 7A that is substantially orthogonal to the seat width direction.

The flange portions 3B, 3C are wall-like elongated protrusions that extend from respective end portions in a width direction of the side surface portion 3A to a side of the second side frame portion 5, and extend along the extending direction of the first side frame portion 3 at the end portions. The width direction of the side surface portions 3A, 5A coincides with a seat front-rear direction.

The flange portions 5B, 5C are wall-like elongated protrusions that extend from respective end portions in a width direction of the side surface portion 5A to a side of the first side frame portion 3, and extend along the extending direction of the second side frame portion 5 at the end portions.

An extended dimension of the flange portions 3B, 5B provided at rear end portions in the seat front-rear direction is greater than an extended dimension of the flange portions 3C, 5C provided at front end portions in the seat front-rear direction. The side surface portion 3A and the flange portions 3B, 3C are integrally molded with a metal plate. Similarly, the side surface portion 5A and the flange portions 5B, 5C are integrally molded with a metal plate.

The upper panel portion 7 extends in the seat width direction and couples an upper end side of the first side frame portion 3 and an upper end side of the second side frame portion 5. The upper panel portion 7 is a panel-shaped frame having a substantially C-like open sectional shape orthogonal to an extending direction thereof.

Figure 3:
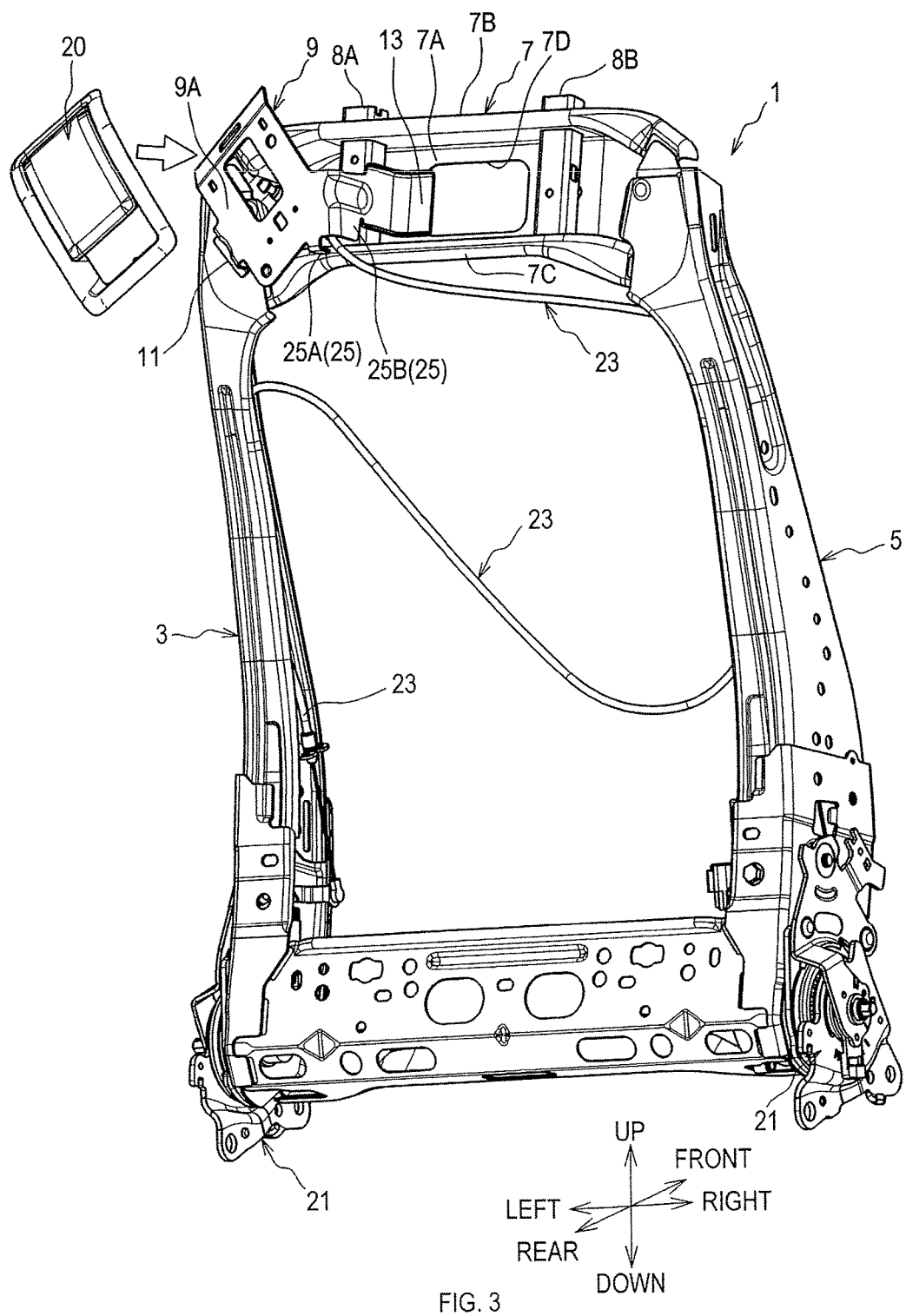
FIG. 3 is a rear side perspective view of the seatback frame according to the first embodiment.

In other words, the upper panel portion 7 comprises the first surface portion 7A that constitutes a strip-like panel portion substantially orthogonal to the seat front-rear direction, and two second surface portions 7B, 7C substantially orthogonal to the up-down direction, as shown in FIG. 3.

The first surface portion 7A has a through-hole 7D that penetrates in the seat front-rear direction, in a middle portion of an extending direction of the first surface portion 7A. The second surface portion 7B is a strip-like protrusion that extends in the seat width direction. The second surface portion 7B extends to a seat rear side at an upper end of the first surface portion 7A.

The second surface portion 7C is a strip-like protrusion that extends in the seat width direction. The second surface portion 7C extend to the seat rear side at a lower end of the first surface portion 7A. The first surface portion 7A and the two second surface portions 7B, 7C are integrally molded with a metal plate.

A first end in the extending direction of the upper panel portion 7 is joined and fixed to an upper end of the first side frame portion 3 by means of a fixing method such as welding. A second end in the extending direction of the upper panel portion 7 is joined and fixed to an upper end of the second side frame portion 5 by means of a fixing method such as welding.

The two support brackets 8A, 8B are fixed to the upper panel portion 7. The two support brackets 8A, 8B are tubular (in the present embodiment, square tubular) members that support a headrest (not shown). The headrest is a member that support the head of a seat occupant.

The support brackets 8A, 8B extend in the substantially up-down direction in a state spaced apart in the seat width direction. Each of the support brackets 8A, 8B according to the present embodiment is welded and fixed to the two second surface portions 7B, 7C in a state penetrating the second surface portion 7B in the up-down direction.

2. Lever Bracket 2. 1 Outline of Lever Bracket and the Like

As shown in FIG. 3, a lever bracket 9 is provided on the first direction side in the seat width direction on an upper end side of the seatback frame 1, that is, on the upper end side of the first side frame portion 3. The lever bracket 9 supports an operation lever 20, and receives an operation force acting on the operation lever 20. The operation lever 20 is an operation portion to be manually operated by a vehicle occupant.

The operation lever 20 according to the present embodiment is the operation portion for operating a walk-in mechanism 21, and is provided on the first direction side in the seat width direction on the upper end side of the seatback. The walk-in mechanism 21 is a mechanism for implementing a "function to make a seat cushion constituting a seat slidable in a seat front-rear direction, in conjunction with an operation to allow a seatback to tilt to a seat front side".

Operation of the operation lever 20 is transmitted to the walk-in mechanism 21 via an operation cable 23 such as a control cable. In particular, the walk-in mechanism 21 is provided on a lower end side of the first side frame portion 3 and on a lower end side of the second side frame portion 5.

The operation cable 23 comprises a flexible tube and a wire slidably inserted to the tube. The tube and the wire are branched into two at a longitudinal intermediate portion thereof, as shown in FIG. 1.

A first end of the tube is locked and fixed to the lever bracket 9, and second ends of the tube are locked and fixed to the respective walk-in mechanisms 21. A first end of the wire is coupled to the operation lever 20, and second ends of the wire are coupled to movable portions 21A (see FIG. 1) such as working levers provided in the respective walk-in mechanisms 21.

Figure 4:
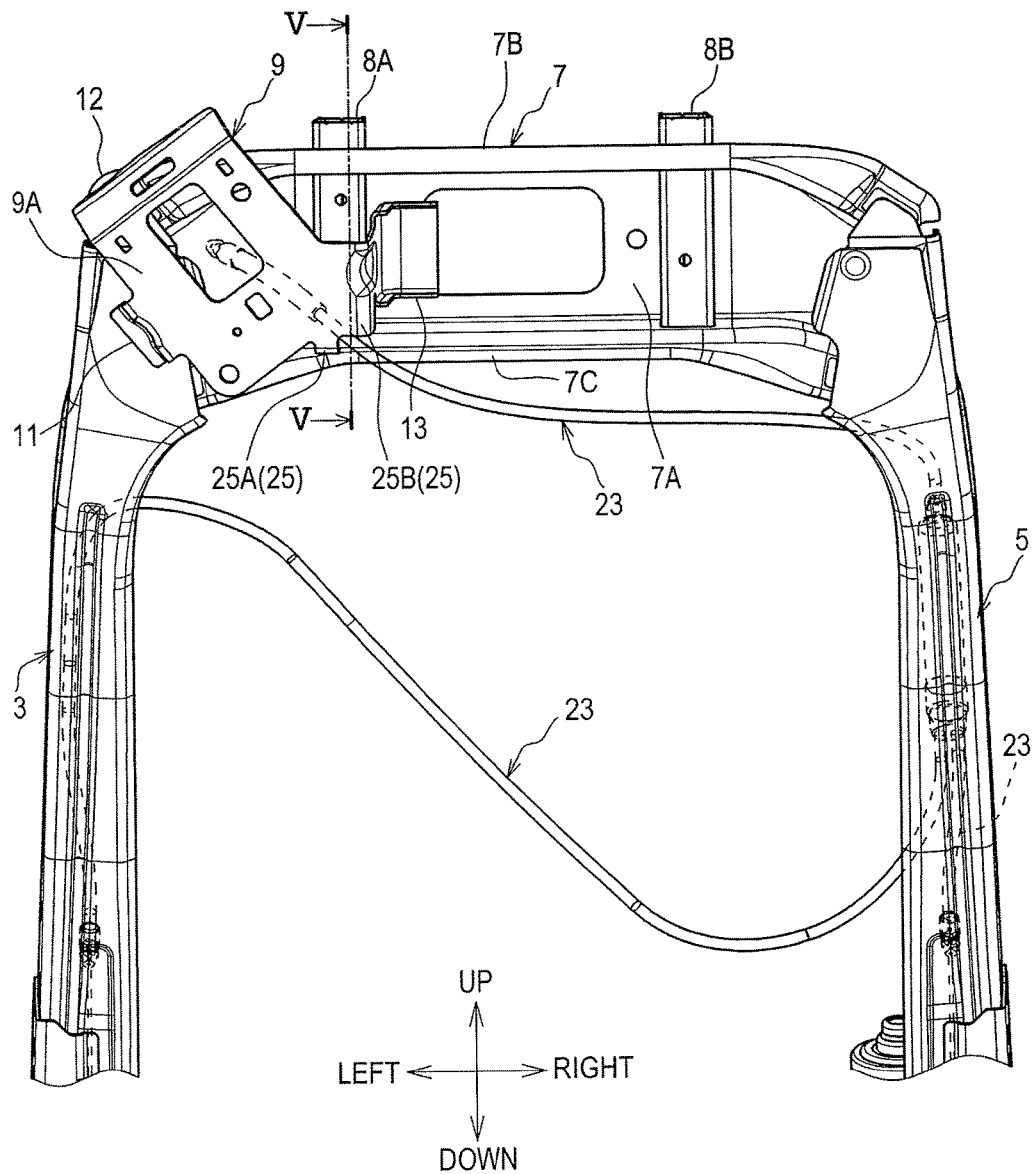
FIG. 4 is a rear view of the seatback frame according to the first embodiment.

The lever bracket 9 is assembled to the upper end side of the first side frame portion 3 from the seat rear side. In particular, the lever bracket 9 is fixed to the seatback frame 1 by means of a fixing method such as welding via the first fixing portion 11, the second fixing portion 12, and the third fixing portion 13, as shown in FIG. 4.

The first fixing portion 11 and the second fixing portion 12 are fixed to the first direction side in the seat width direction on the upper end side of the seatback frame 1. The third fixing portion 13 is fixed closer to the second direction side in the seat width direction than the first fixing portion 11 and the second fixing portion 12 in the upper panel portion 7.

In the present embodiment, the first fixing portion 11 is fixed to the upper end side of the first side frame portion 3. The second fixing portion 12 is fixed to an upper surface on the first direction side in the seat width direction in the upper panel portion 7, that is, to a first end in the seat width direction of the second surface portion 7B. The third fixing portion 13 is fixed to between the two support brackets 8A, 8B in the first surface portion 7A.

2. 2 Routing Structure of Operation Cable

Figure 5:
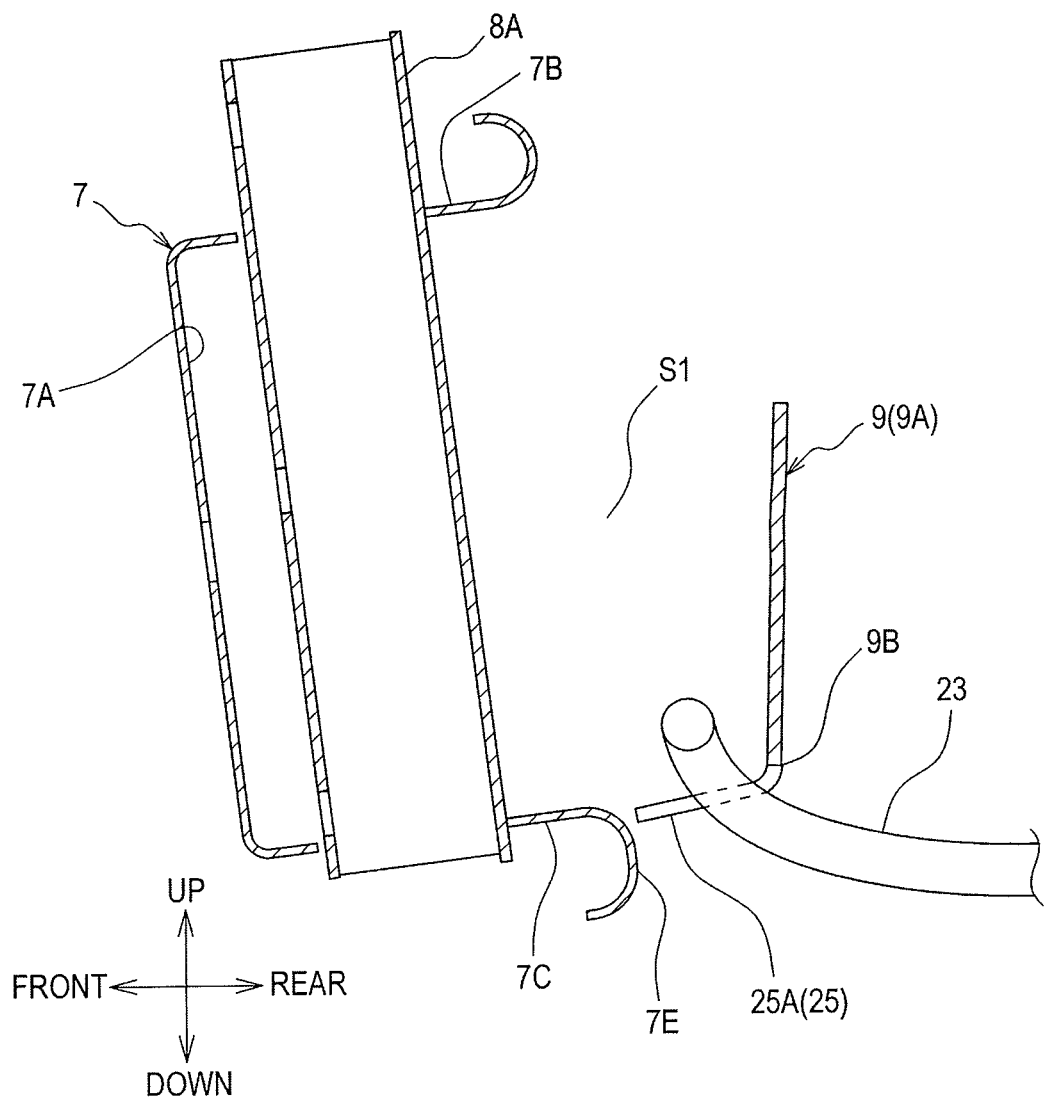
FIG. 5 is a sectional view taken along a line V-V in FIG. 4.

As shown in FIG. 5, the operation cable 23 is provided such that a first end thereof is arranged in a space S1 between the lever bracket 9 and the first surface portion 7A, and passes through an end portion 9B of the lever bracket 9 and an end portion 7E of the upper panel portion 7 to be routed outside the space S1 from the space S1.

Figure 6:
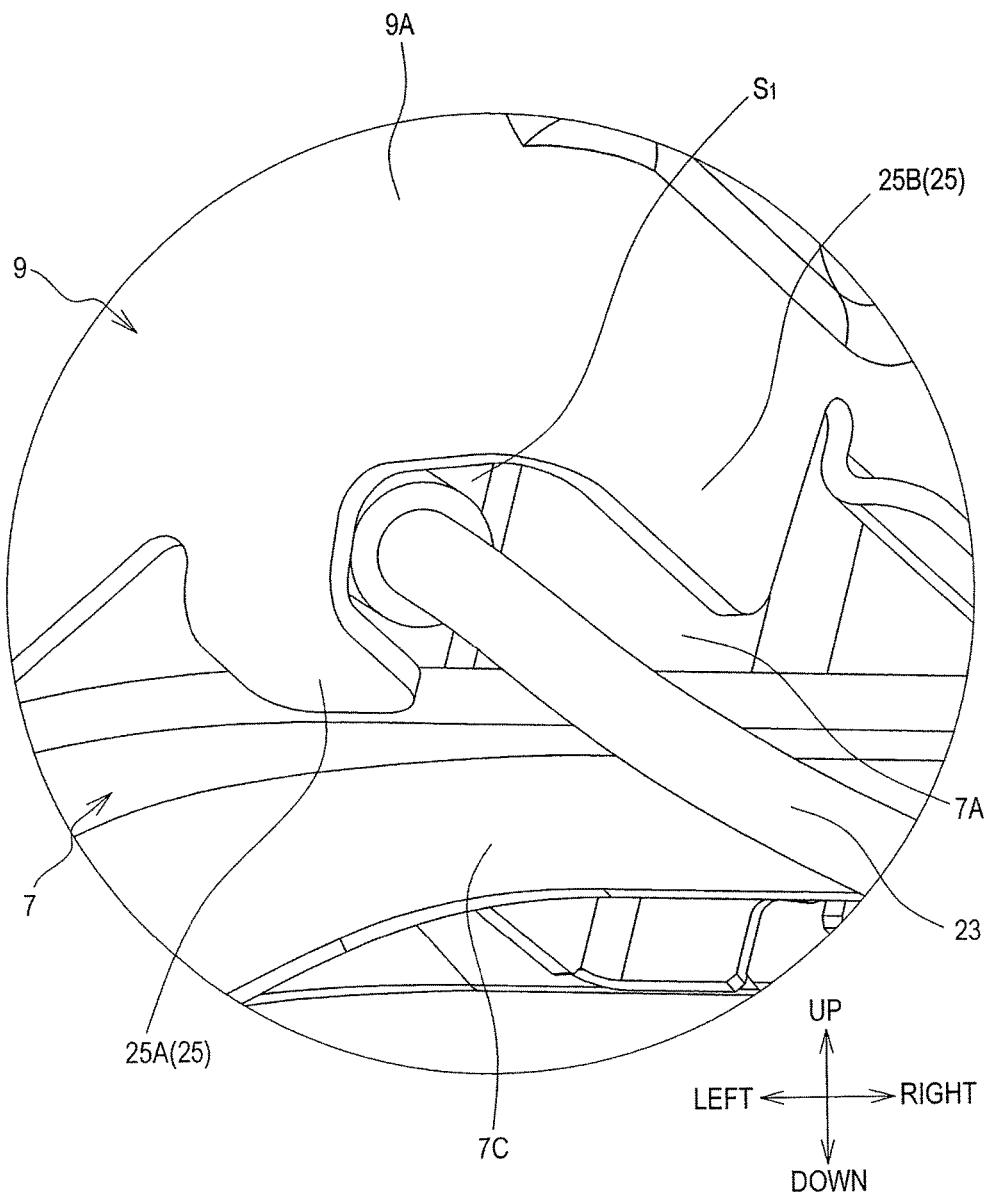
FIG. 6 is an enlarged view of a routing restricting portion according to the first embodiment.

As shown in FIG. 6, the lever bracket 9 comprises a routing restricting portion 25 that restricts a routing direction of the operation cable 23. The routing restricting portion 25 comprises a first restricting portion 25A and a second restricting portion 25B.

The first restricting portion 25A restricts movement of the operation cable 23 in the seat width direction (in the present embodiment, to the side of the first side frame portion 3). The second restricting portion 25B restricts movement of the operation cable 23 in the up-down direction (in the present embodiment, upward).

The first end of the operation cable 23 is arranged in the space S1 between the lever bracket 9 and the first surface portion 7A. Therefore, the lever bracket 9 and the upper panel portion 7 function as restricting portions that restrict the routing direction in the seat front-rear direction.

The first restricting portion 25A and the second restricting portion 25B are configured with an extending portion that extends from an end portion of the lever bracket 9 to a side of the first surface portion 7A. In other words, the first restricting portion 25A and the second restricting portion 25B extend from an end portion side of a substantially rectangular plate-shaped plate portion 9A (see FIG. 4) to the side of the first surface portion 7A, and are integrally molded with the plate portion 9A.

3. Characteristics of Conveyance Seat (in Particular, Seatback Frame Structure) According to the Present Embodiment The operation cable 23 according to the present embodiment passes through the end portion 9B of the lever bracket 9 and/or the end portion 7E of the upper panel portion 7, to be routed outside the space S1 between the lever bracket 9 and the first surface portion 7A from the space S1 (see FIG. 5).

Therefore, when an operation force acts on the operation cable 23, the operation cable 23 may be moved and bitten into a gap between the lever bracket 9 and the upper panel portion 7.

However, in the present embodiment, since the routing restricting portion 25 is provided to restrict the routing direction of the operation cable 23, the operation cable 23 can be inhibited from being bitten into the gap between the lever bracket 9 and the upper panel portion 7. Accordingly, the operation cable 23 can be reliably operated.

The routing restricting portion 25 comprises a first restricting portion 25A that restricts the routing direction along the seat width direction, and a second restricting portion 25B that restricts the routing direction along the up-down direction. Also, since the lever bracket 9 and the upper panel portion 7 can restrict the routing direction in the seat front-rear direction, the routing direction of the operation cable 23 can be reliably restricted.

The routing restricting portion 25, i.e., the first restricting portion 25A and the second restricting portion 25B, is configured with the extending portion that extends from the end portion of the lever bracket 9 to the side of the first surface portion 7A. Therefore, the routing restricting portion 25 can be easily provided.

[Second Embodiment]

The operation cable 23 according to the above-described first embodiment is configured to pass through the end portion 9B of the lever bracket 9 and/or the end portion 7E of the upper panel portion 7, to be routed outside the space S1 between the lever bracket 9 and the first surface portion 7A from the space S1 (see FIG. 5).

Figure 7:
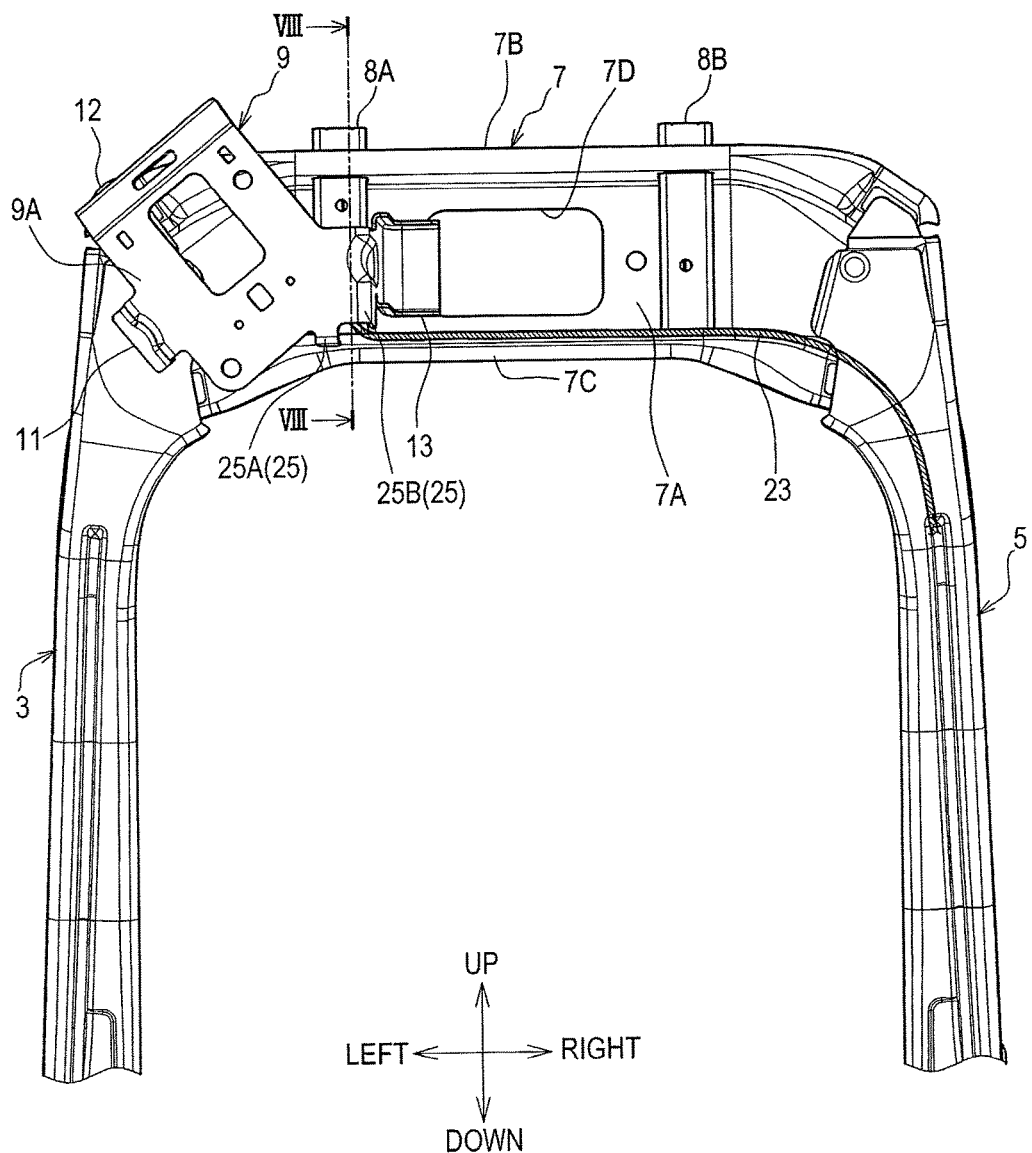
FIG. 7 is a rear view of a seatback frame according to a second embodiment.
Figure 8:
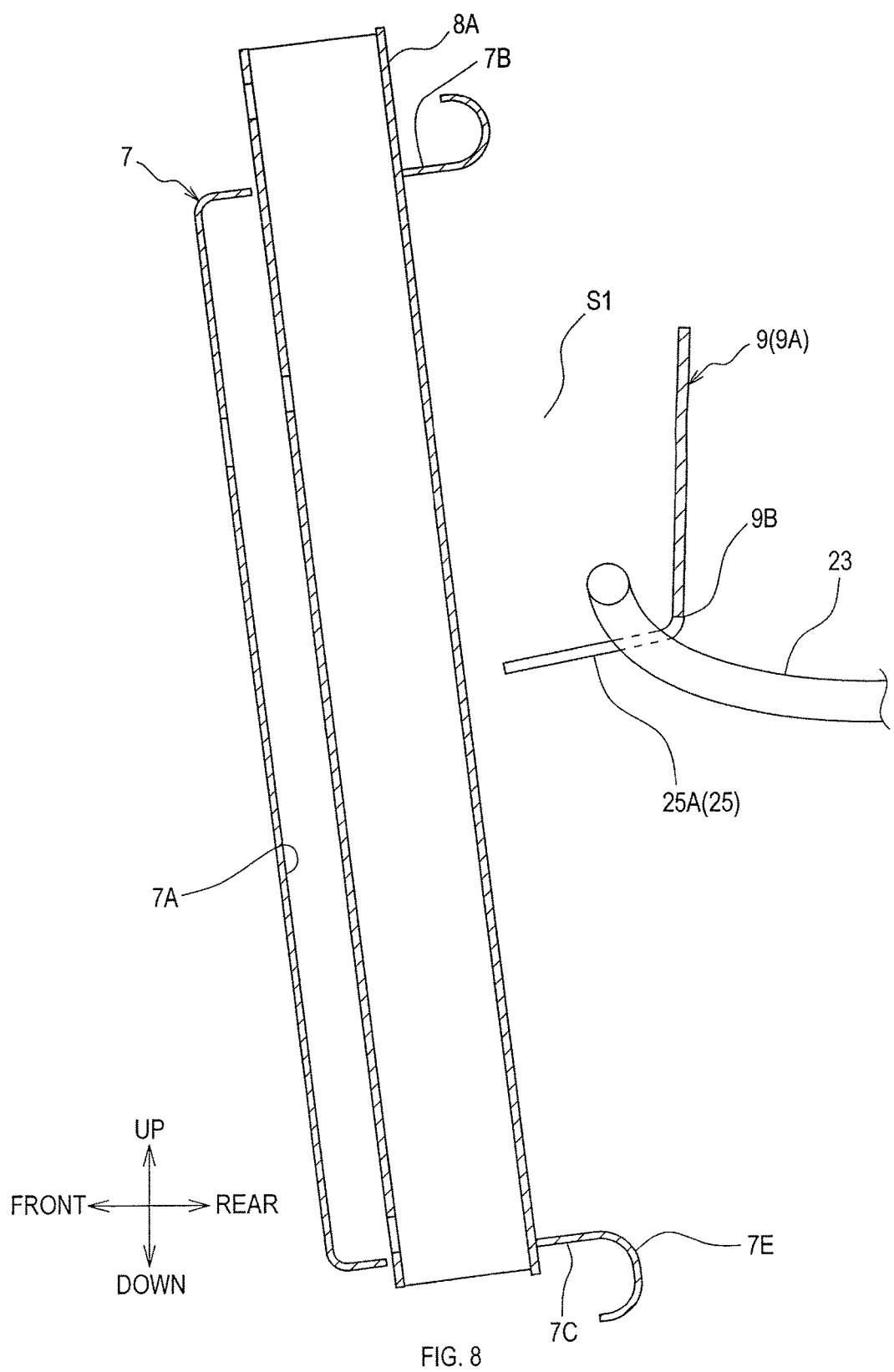
FIG. 8 is a sectional view taken along a line VIII-VIII in FIG. 7.

However, the operation cable 23 according to the present embodiment, as shown in FIGS. 7 and 8, does not pass through the end portion 7E of the upper panel portion 7, and passes through the end portion 9B of the lever bracket 9 to be routed outside the space S1 from the space S1.

The routing restricting portion 25 according to the present embodiment as well comprises the first restricting portion 25A and the second restricting portion 25B. The operation cable 23 routed outside the space S1, as shown in FIG. 7, is routed to the side of the second side frame portion 5 along the second surface portion 7C.

The same components and the like as in the first embodiment described above are denoted by the same reference numerals as those in the first embodiment described above. Thus, explanations thereof are not repeated.

[Other Embodiments]

The two side frame portions 3, 5 according to the above-described first and second embodiments are in panel shape respectively comprising the side surface portions 3A, 5A and the flange portions 3B, 3C, 5B, 5C. However, the present disclosure is not limited to this. For example, the two side frame portions 3, 5 may be configured with a truss-structured pipe.

The routing restricting portion 25 according to the above-described first and second embodiments restricts the routing direction along the seat width direction and the up-down direction. However, the present disclosure is not limited to this. For example, the routing restricting portion 25 may restrict the routing direction along at least one of the seat width direction and the up-down direction.

The routing restricting portion 25 according to the above-described first and second embodiments is integrally molded with the plate portion 9A, i.e., the lever bracket 9. However, the present disclosure is not limited to this. For example, the routing restricting portion 25 may be produced as a separate component, and thereafter integrated with the lever bracket 9 by welding or by screws, etc.

The routing restricting portion 25 according to the above-described first and second embodiments is provided in the lever bracket 9. However, the present disclosure is not limited to this. For example, the routing restricting portion 25 may be provided in at least one of the lever bracket 9 and the upper panel portion 7.

The operation lever 20 according to the above-described first and second embodiments is an operation lever to operate the walk-in mechanism 21. However, the present disclosure is not limited to this. For example, the operation lever 20 may be an operation lever to operate other mechanisms.

The conveyance seat according to the above-described first and second embodiments is for a car. However, the present disclosure is not limited to this. For example, the conveyance seat can be applied to a conveyance of such as a railroad vehicle, a ship and an airplane.

Also, the present disclosure is not limited to the first and second embodiments described above as long as it meets the gist of the invention disclosed in the claims. Accordingly, at least two of the plurality of embodiments described above may be combined.

[Third Embodiment]

In the present embodiment, an explanation will be made on a seat in the second row on an entrance side of a minivan having three-row independent seats, or a front passenger seat of an ordinary passenger car. Directions in the following explanation indicate directions in a state in which a conveyance seat according to the present embodiment is assembled to the vehicle.

1. Outline of Conveyance Seat

Figure 9:
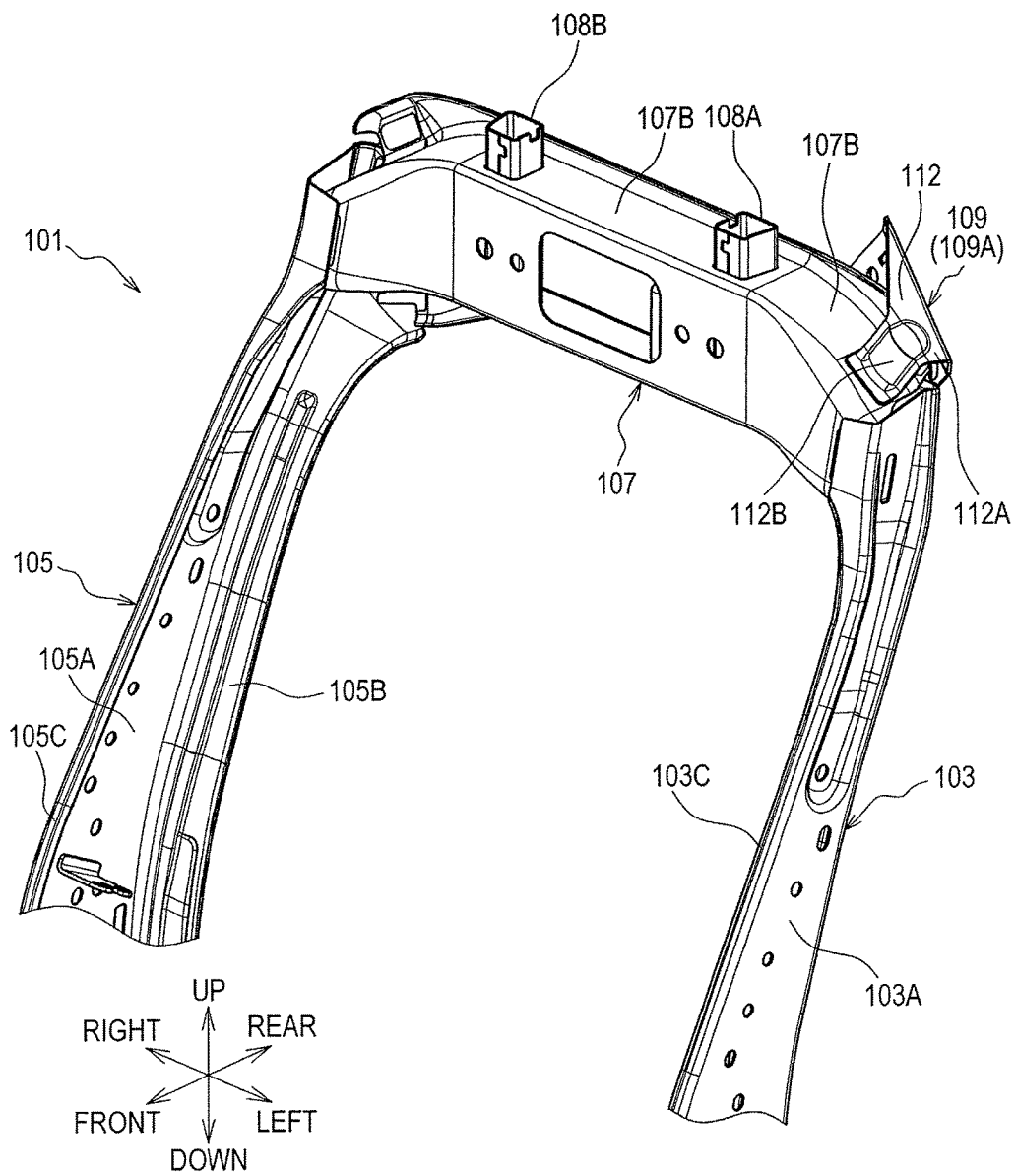
FIG. 9 is an external perspective view of a seatback frame according to a third embodiment.

As shown in FIG. 9, a seatback frame 101 of a conveyance seat according to the present embodiment is a panel type seatback frame configured with a gate-shaped rigid-frame structure. The seatback frame 101 constitutes a seatback of the conveyance seat.

The seatback is a backrest part that supports the back of a seat occupant. The seatback frame 101 is covered by a cushion pad portion (not shown) and a skin portion (not shown).

The cushion pad portion is a member to absorb an impact force. The cushion pad portion is made of material, such as foamed urethane, that deforms to absorb an impact force. The skin portion is a member to cover the cushion pad portion. The skin portion is made of leather or synthetic leather, for example.

The seatback frame 101 comprises two side frame portions 103, 105, and an upper panel portion 107. The two side frame portions 103, 105 are frames that extend in a substantially up-down direction, and are arranged to face each other in a seat width direction. The seat width direction coincides with a left-right direction of a vehicle in the present embodiment.

Hereinafter, one of the two side frame portions 103, 105 that is arranged on a first direction (in the present embodiment, a left end) side of the seat width direction is referred to as a first side frame portion 103. The other of the two side frame portions 103, 105 that is arranged on a second direction (in the present embodiment, a right end) side of the seat width direction is referred to as a second side frame portion 105.

The first side frame portion 103 and the second side frame portion 105 are panel members, which are substantially symmetrical to each other in the seat width direction, and have a C-like open sectional shape orthogonal to an extending direction thereof.

Figure 10:
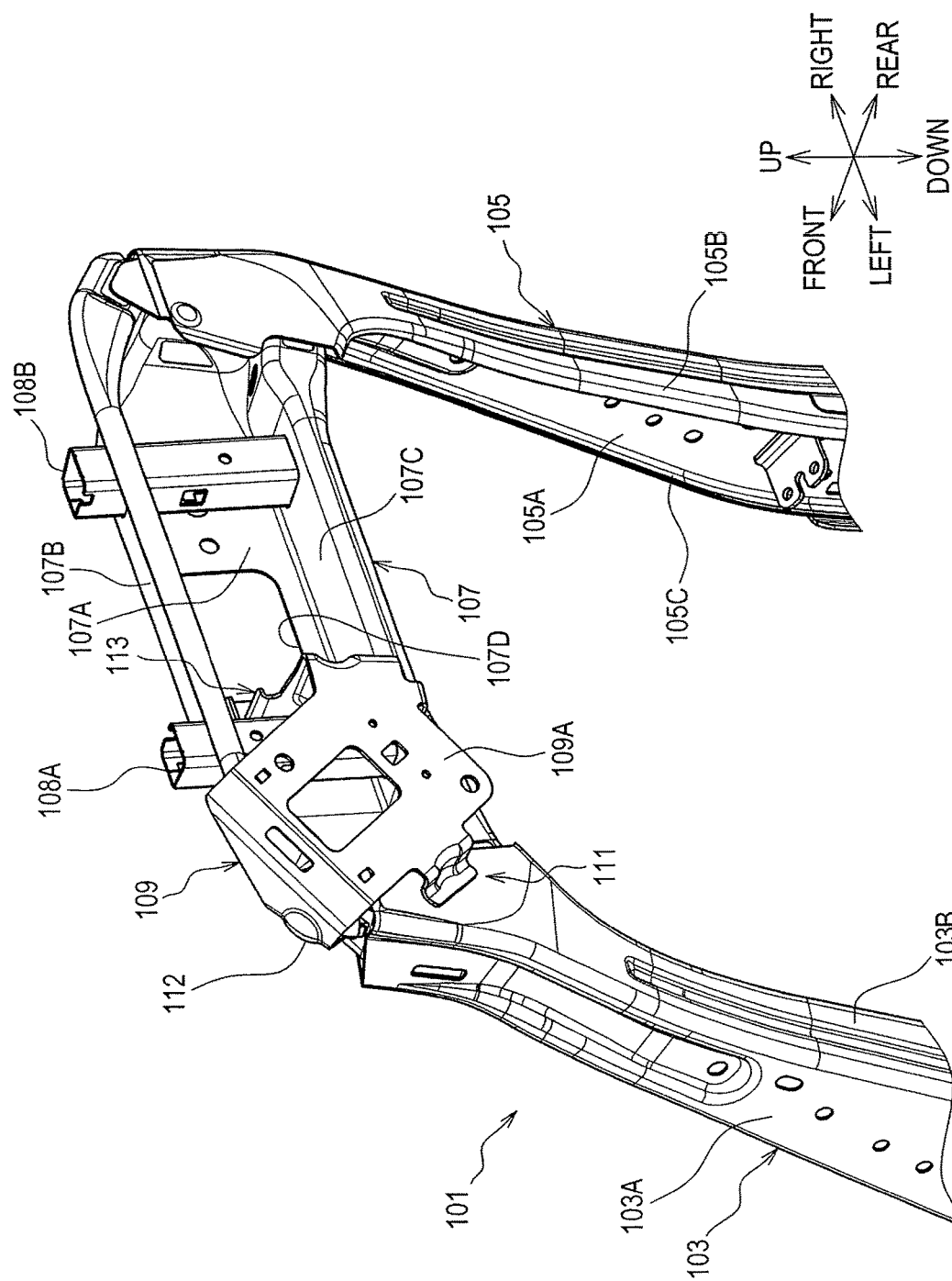
FIG. 10 is an external perspective view of the seatback frame according to the third embodiment.

In particular, the two side frame portions 103, 105 respectively have side surface portions 103A, 105A and flange portions 103B, 103C, 105B, 105C, as shown in FIGS. 9 and 10. The side surface portions 103A, 105A constitute a first surface portion 107A that is substantially orthogonal to the seat width direction.

The flange portions 103B, 103C are wall-like elongated protrusions that extend from respective end portions in a width direction of the side surface portion 103A to a side of the second side frame portion 105, and extend along the extending direction of the first side frame portion 103 at the end portions. The width direction of the side surface portions 103A, 105A coincides with a seat front-rear direction.

The flange portions 105B, 105C are wall-like elongated protrusions that extend from respective end portions in a width direction of the side surface portion 105A to a side of the first side frame portion 103, and extend along the extending direction of the second side frame portion 105 at the end portions.

An extended dimension of the flange portions 103B, 105B provided at rear end portions in the seat front-rear direction is greater than an extended dimension of the flange portions 103C, 105C provided at front end portions in the seat front-rear direction. The side surface portion 103A and the flange portions 103B, 103C are integrally molded with a metal plate. Similarly, the side surface portion 105A and the flange portions 105B, 105C are integrally molded with a metal plate.

The upper panel portion 107 extends in the seat width direction and couples an upper end side of the first side frame portion 103 and an upper end side of the second side frame portion 105. The upper panel portion 107 is a panel-shaped frame having a substantially C-like open sectional shape orthogonal to an extending direction thereof.

Figure 11:
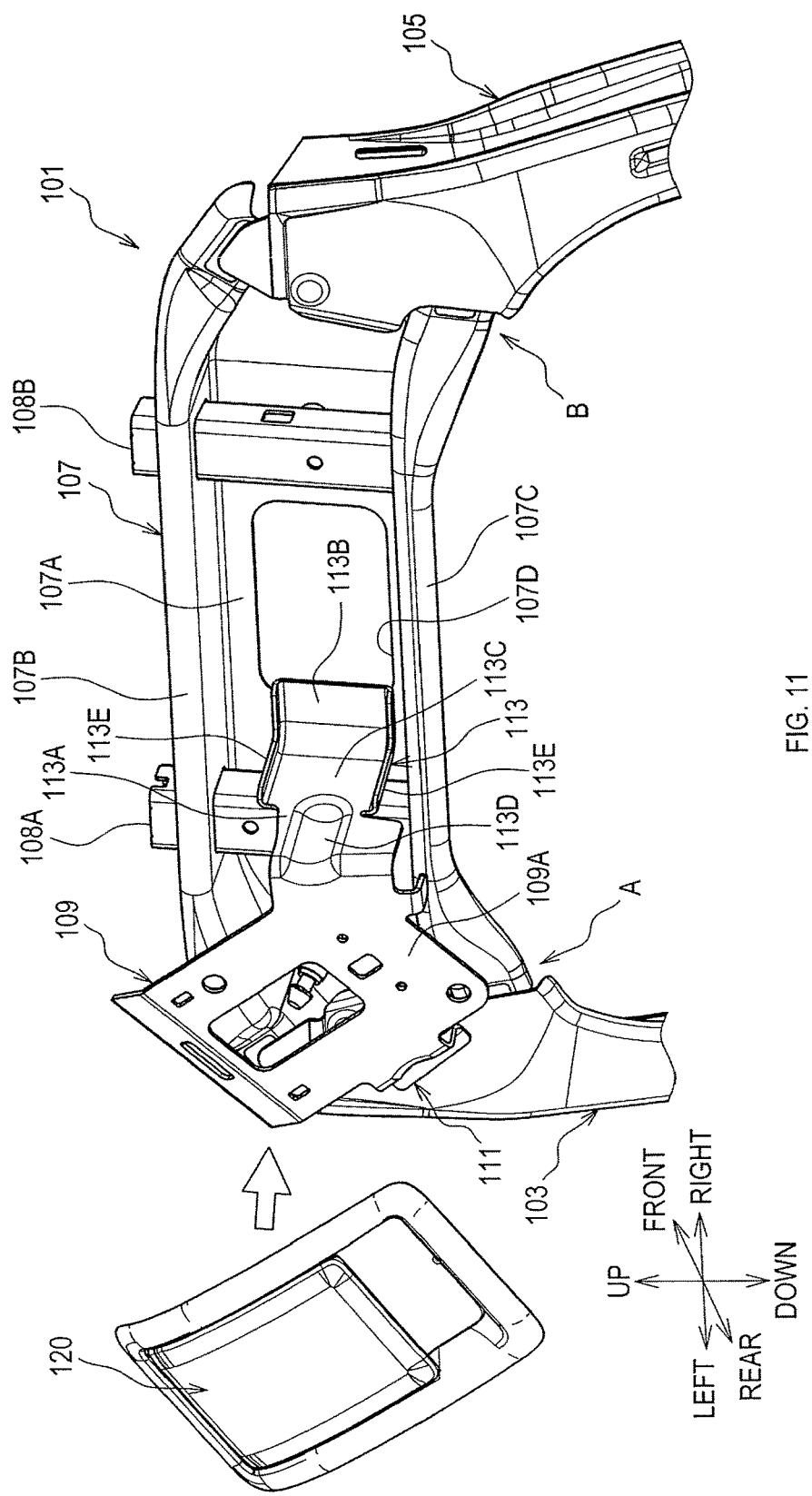
FIG. 11 is an external perspective view of the seatback frame according to the third embodiment.

In other words, the upper panel portion 107 comprises the first surface portion 107A that constitutes a strip-like panel portion substantially orthogonal to the seat front-rear direction, and two second surface portions 107B, 107C substantially orthogonal to the up-down direction, as shown in FIG. 11.

The first surface portion 107A has a through-hole 107D that penetrates in the seat front-rear direction, in a middle portion of an extending direction of the first surface portion 107A. The second surface portion 107B is a strip-like protrusion that extends in the seat width direction. The second surface portion 107B extends to a seat rear side at an upper end of the first surface portion 107A.

The second surface portion 107C is a strip-like protrusion that extends in the seat width direction. The second surface portion 107C extend to the seat rear side at a lower end of the first surface portion 107A. The first surface portion 107A and the two second surface portions 107B, 107C are integrally molded with a metal plate.

A first end in the extending direction of the upper panel portion 107 is joined and fixed to an upper end of the first side frame portion 103 by means of a fixing method such as welding. A second end in the extending direction of the upper panel portion 107 is joined and fixed to an upper end of the second side frame portion 105 by means of a fixing method such as welding.

The first side frame portion 103 and the upper panel portion 107 are joined and fixed at a first joining portion A, and the second side frame portion 105 and the upper panel portion 107 are joined and fixed at a second joining portion B.

Therefore, the seatback frame 101 according to the present embodiment constitutes a gate-shaped rigid-frame structure at the first joining portion A and the second joining portion B which are joining portions between the upper panel portion 107 and the two side frame portions 103, 105.

The two support brackets 108A, 108B are fixed to the upper panel portion 107. The two support brackets 108A, 108B are tubular (in the present embodiment, square tubular) members that support a headrest (not shown). The headrest is a member that support the head of a seat occupant.

The support brackets 108A, 108B extend in the substantially up-down direction in a state spaced apart in the seat width direction. Each of the support brackets 108A, 108B according to the present embodiment is welded and fixed to the two second surface portions 107B, 107C in a state penetrating the second surface portion 107B in the up-down direction.

2. Fixing Structure of Lever Bracket 2. 1 Outline of Fixing Structure

As shown in FIG. 11, a lever bracket 109 is provided on the first direction side in the seat width direction on an upper end side of the seatback frame 101, that is, on the upper end side of the first side frame portion 103. The lever bracket 109 supports an operation lever 120, and receives an operation force acting on the operation lever 120. The operation lever 120 is an operation portion to be manually operated by a vehicle occupant.

The operation lever 120 according to the present embodiment is the operation portion for operating the above-described "walk-in mechanism" (not shown), and is provided on the first direction side in the seat width direction on the upper end side of the seatback. Operation of the operation lever 120 is transmitted to the walk-in mechanism via an operation cable (not shown) such as a control cable.

Figure 12:
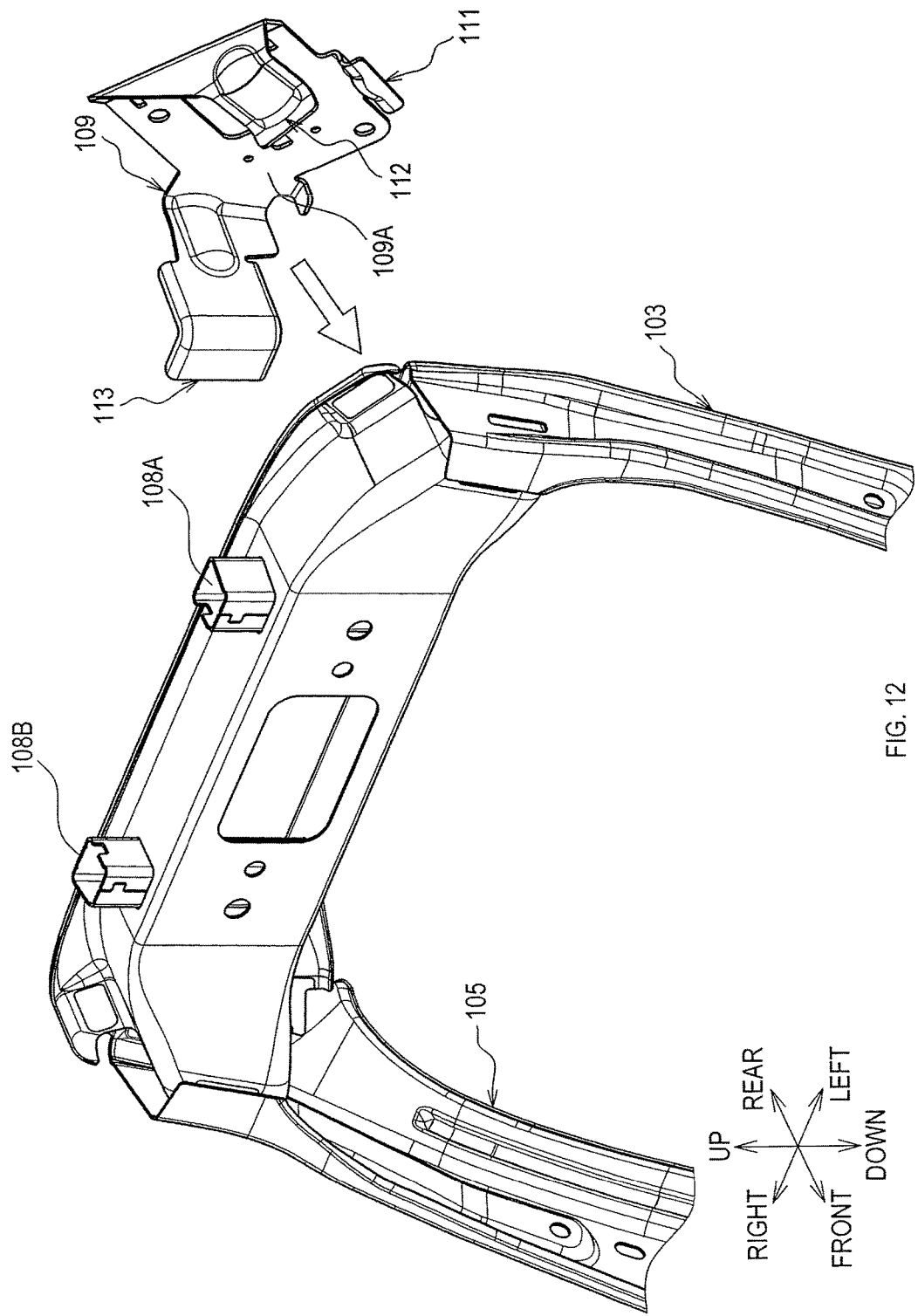
FIG. 12 is an external perspective view of the seatback frame according to the third embodiment.

The lever bracket 109, as shown in FIG. 12, is assembled to the first direction side in the seat width direction on the upper end side on the seat rear side of the seatback frame 101. In particular, as shown in FIGS. 13A to 13C, the lever bracket 109 is fixed to the seatback frame 101 via a first fixing portion 111, a second fixing portion 112 and a third fixing portion 113 by means of a fixing method such as welding.

The first fixing portion 111 and the second fixing portion 112 are fixed to the first direction side in the seat width direction on the upper end side of the seatback frame 101. The third fixing portion 113 is fixed closer to the second direction side in the seat width direction than the first fixing portion 111 and the second fixing portion 112 in the upper panel portion 107.

In particular, the first fixing portion 111 is fixed to the upper end side of the first side frame portion 103. The second fixing portion 112 is fixed to an upper surface on the first direction side in the seat width direction in the upper panel portion 107, that is, to the first end in the seat width direction in the second surface portion 107B. The third fixing portion 113, as shown in FIG. 11, is fixed to between the two support brackets 108A, 108B in the first surface portion 107A.

2. 2 Shape of Each Fixing Portion

Figure 14:
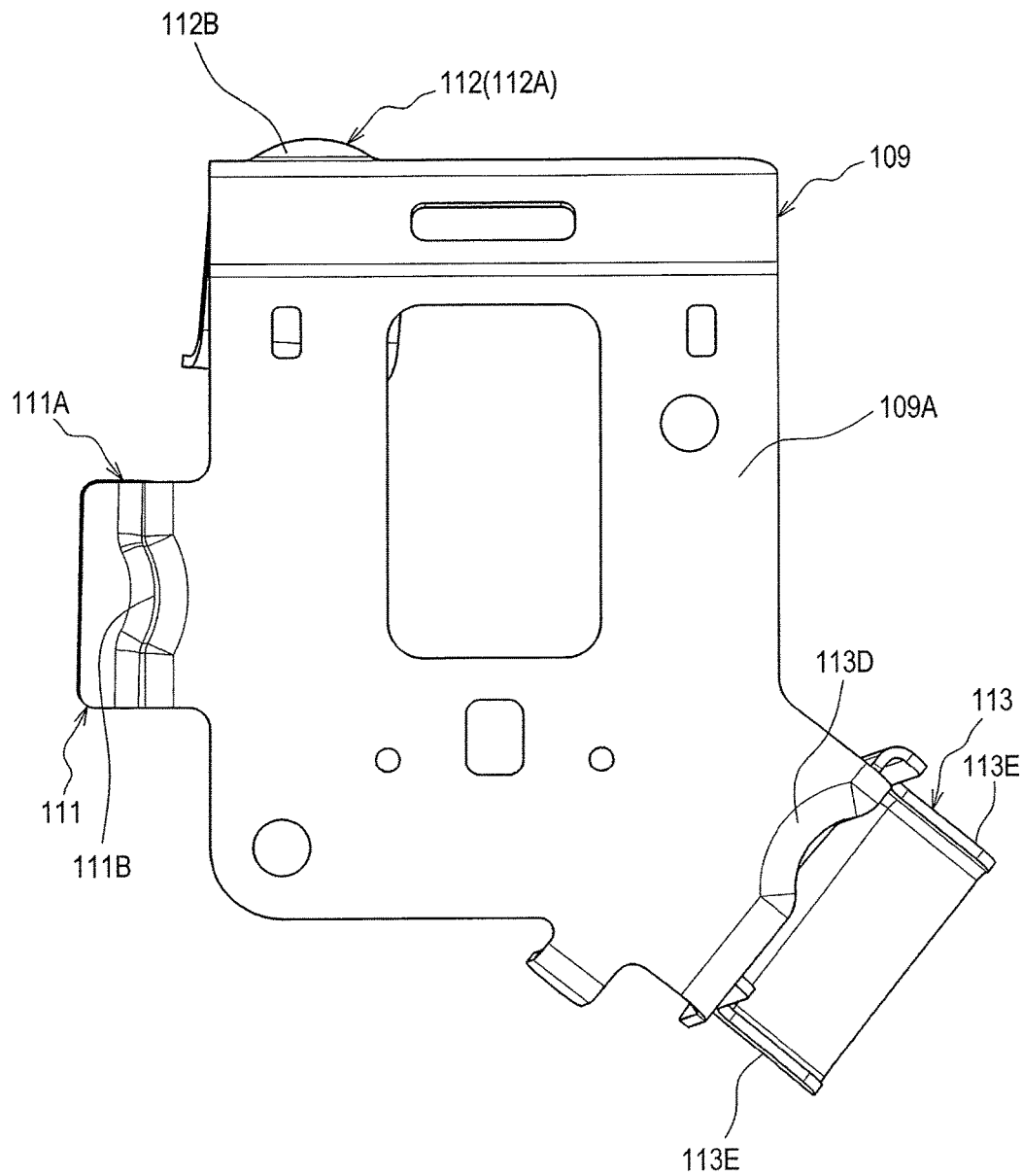
FIG. 14 is a front view of the lever bracket according to the third embodiment.
Figure 15:
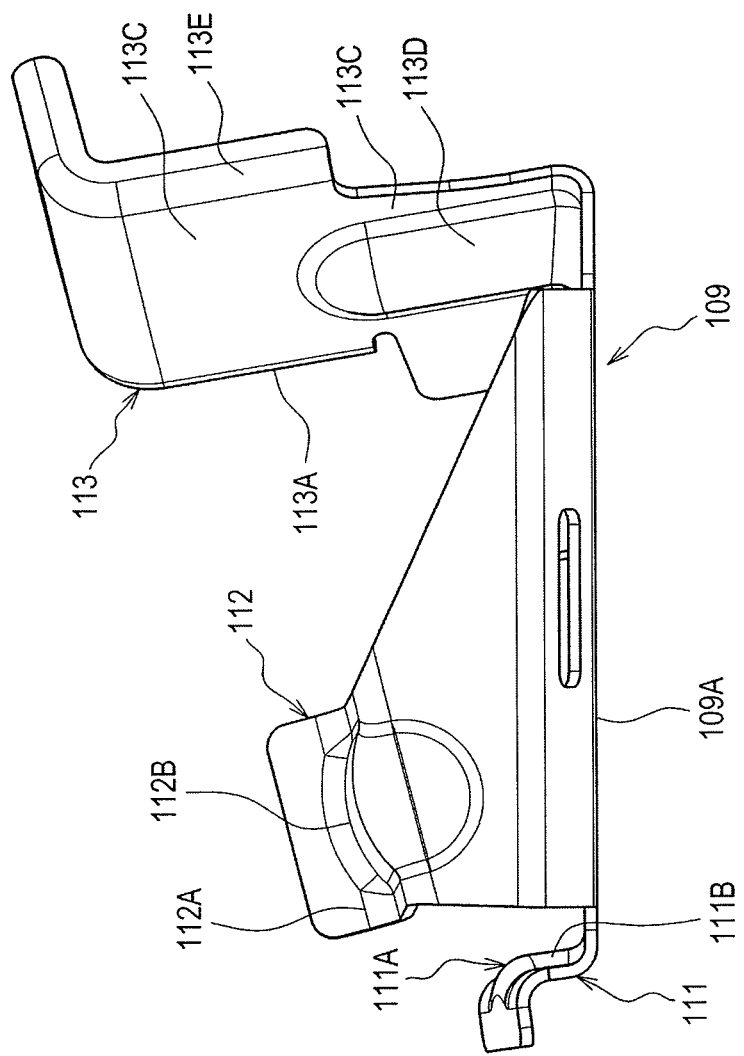
FIG. 15 is a top view of the lever bracket in FIG. 14.
Figure 16:
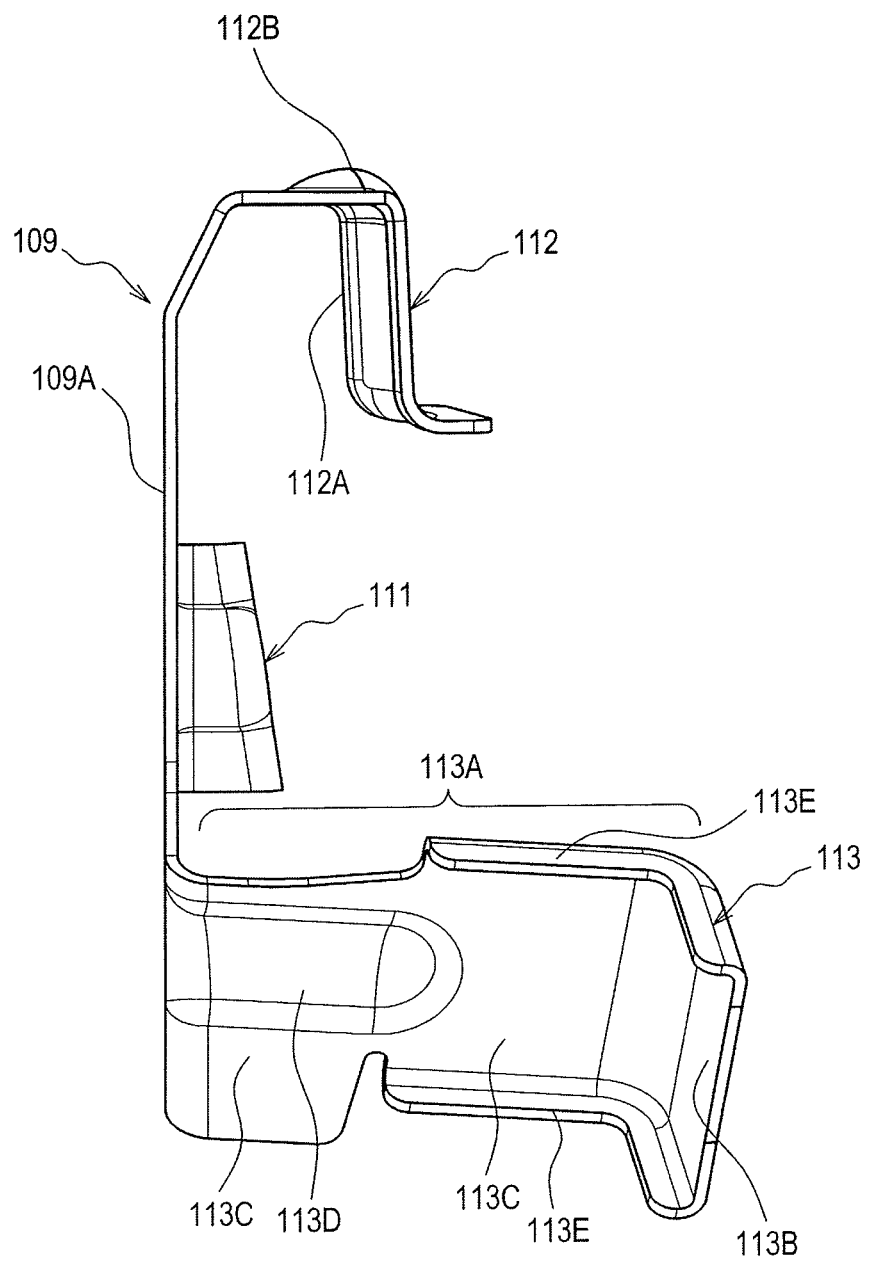
FIG. 16 is a right side view of the lever bracket in FIG. 14.

The first fixing portion 111 to the third fixing portion 113 are provided at respective end portions of a plate portion 109A, as shown in FIGS. 14 to 16. The plate portion 109A is a plate-shaped member that supports the operation lever 120.

<First Fixing Portion>

The first fixing portion 111, as shown in FIG. 15, is configured with an extending portion 111A. The extending portion 111A is a member extending from an end portion side of the substantially rectangular plate-shaped plate portion 109A toward the seatback frame 101. A leading end side in an extending direction of the extending portion 111A is welded and fixed to the upper end side of the first side frame portion 103.

The extending portion 111A, as shown in 17B, comprises a concave or convex bead portion 111B. The extending portion 111A and the bead portion 111B are integrally formed with the plate portion 109A by means of plastic processing such as press forming.

<Second Fixing Portion>

The second fixing portion 112, as shown in FIG. 16, is configured with an extending portion 112A. The extending portion 112A, as shown in FIG. 9, is a member extending from the end portion side of the plate portion 109A toward the seatback frame 101 in a manner curved in a substantially U-shape.

That is, the extending portion 112A is provided on an upper end side of the plate portion 109A, and an upper end of the plate portion 109A provided with the extending portion 112A is at the same position as or a higher position than an upper edge of the seatback frame 101.

Therefore, the extending portion 112A according to the present embodiment extends from the end portion side of the plate portion 109A to the side of the seatback frame 101 in a manner curved in a substantially U-shape. The "upper end side of the plate portion 109A" refers to an upper end side of the plate portion 109A in a state in which the lever bracket 109 is fixed to the seatback frame 101.

Figure 17B:
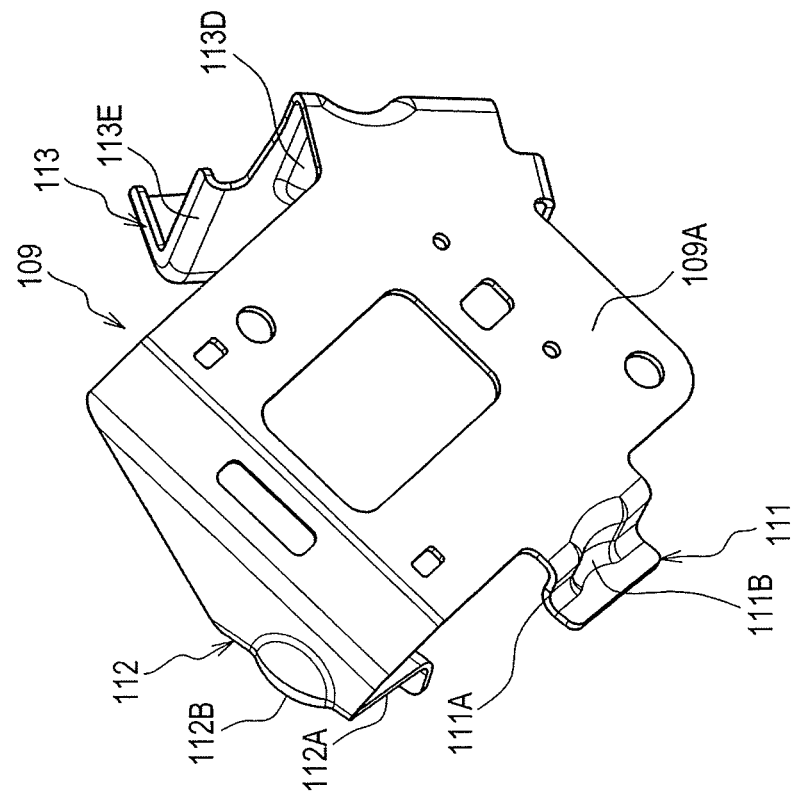
FIG. 17B is a front perspective view of the lever bracket according to the third embodiment.
Figure 17A:
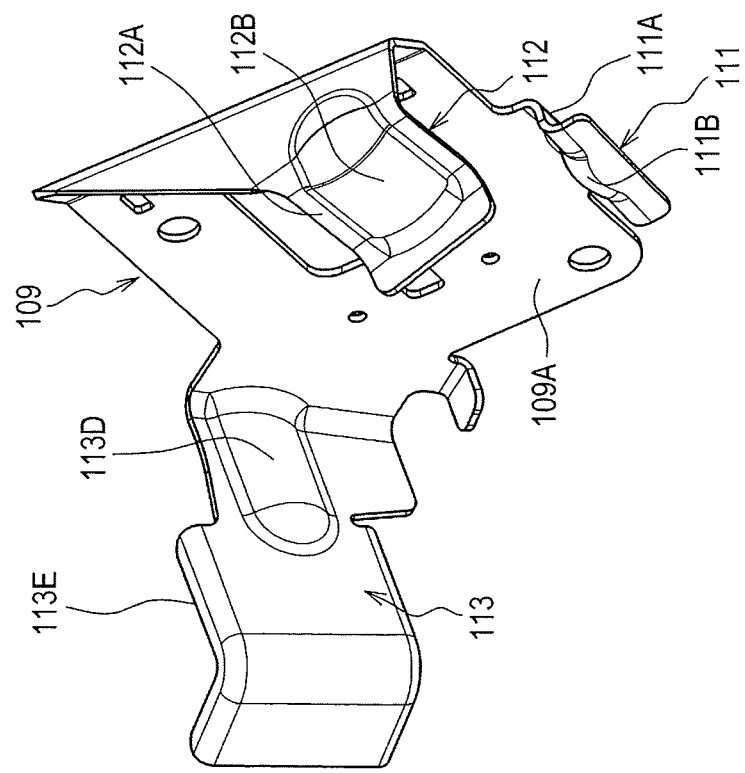
FIG. 17A is a top side perspective view of the lever bracket according to the third embodiment.

A leading end side in an extending direction of the extending portion 112A is welded and fixed to the second surface portion 107B of the upper panel portion 107. The extending portion 112A, as shown in FIG. 17A, comprises a concave or convex bead portion 112B. The extending portion 112A and the head portion 112B are integrally formed with the plate portion 109A by means of plastic processing such as press forming.

<Third Fixing Portion>

The third fixing portion 113, as shown in FIG. 16, comprises an extending portion 113A and a leg portion 113B. The extending portion 113A, as shown in FIG. 11, is a member extending from the lever bracket 109, i.e., the plate portion 109A, toward the first surface portion 107A of the upper panel portion 107.

The leg portion 113B is a member welded and fixed to the first surface portion 107A. The leg portion 113B is a member extending from a leading end in an extending direction of the extending portion 113A in parallel to the first surface portion 107A. That is, the third fixing portion 113 is substantially L-shaped since the extending portion 113A and the leg portion 113B are substantially orthogonal to each other.

The extending portion 113A, as shown in FIG. 16, comprises a plate-like portion 113C, a bead portion 113D, and two flange portions 113E. The plate-like portion 113C is a substantially strip-like portion extending from the end portion side of the plate portion 109A toward the first surface portion 107A.

The bead portion 113D is a concave or convex curved portion provided in the plate-like portion 113C. The two flange portions 113E are wall-like protrusions provided at an end portion in a width direction of the plate-like portion 113C and extending in a direction substantially orthogonal to the plate-like portion 113C.

The width direction of the plate-like portion 113C refers to a direction orthogonal to an extending direction of the plate-like portion 113C and a plate surface of the plate-like portion 113C. The width direction of the plate-like portion 113C according to the present embodiment coincides with an extending direction of the support bracket 108A, that is, the up-down direction (see FIG. 11).

The bead portion 113D is provided on a side of the lever bracket 109 of the plate-like portion 113C, that is, on a side of the plate portion 109A in the plate-like portion 113C. The two flange portions 113E are provided on a side of the leg portion 113B in the plate-like portion 113C.

In other words, the bead portion 113D, as shown in FIG. 11, is provided in a range from the plate portion 109A to a position corresponding to the support bracket 108A. Therefore, in the extending direction of the plate-like portion 113C, the bead portion 113D is at a position displaced to the seat rear side with respect to the support bracket 108A.

The two flange portions 113E are provided in a range at least from the position corresponding to the support bracket 108A to the side of the leg portion 113B. In other words, when the two flange portions 113E are projected on a virtual plane orthogonal to the seat width direction, parts of the projected flange portions 113E overlap with the support bracket 108A projected on the virtual plane.

In the present embodiment, the flange portion 113E is also provided on both sides in a width direction of the leg portion 113B. The extending portion 113A, that is, the plate-like portion 113C, the bead portion 113D, and the two flange portions 113E, and the leg portion 113B are integrally formed with the plate portion 109A by means of plastic processing such as press forming.

3. Characteristics of Conveyance Seat According to the Present Embodiment

The lever bracket 109 according to the present embodiment is fixed to the seatback frame 101 via the first fixing portion 111 to the third fixing portion 113. Therefore, the lever bracket 109 according to the present embodiment can distribute an operation force of the operation lever 120 to at least three positions. Therefore, a conveyance seat can be provided that can exhibit sufficient rigidity against the operation force.

In the present embodiment, as shown in FIG. 11, directions of plate surfaces of the respective extending portions 111A to 113A of the first fixing portion 111 to third fixing portion 113 are configured to cross each other. The "directions of a plate surface" refer to directions orthogonal to the plate surfaces.

Therefore, the lever bracket 109 according to the present embodiment can counteract any of a moment around the seat front-rear direction, a moment around the seat width direction, and a moment around the up-down direction (vertical direction). Therefore, a conveyance seat can be provided that can exhibit sufficient rigidity against an operation force.

The seatback frame 101 according to the present embodiment is configured with the first side frame portion 103 and the upper panel portion 107 joined by a fixing method such as welding. The first fixing portion 111 is fixed to the first side frame portion 103, and the second fixing portion 112 is fixed to the first direction side in the seat width direction of the upper panel portion 107.

In other words, the lever bracket 109 is fixed to the seatback frame 101 so as to bridge the first side frame portion and the upper panel portion 107. Therefore, since the lever bracket 109 functions as a reinforcing member, joining strength between the first side frame portion 103 and the upper panel portion 107 can be enhanced. Further the lever bracket 109 can be firmly fixed to the seatback frame 101.

The third fixing portion 113 is positioned between the two support brackets 108A, 108B in the first surface portion 107A. Therefore, the third fixing portion 113 can be easily fixed to the first surface portion 107A by means of a fixing method such as welding.

Due to existence of the plate portion 109A, it is difficult to weld the third fixing portion 113 to the first surface portion 107A closer to the first direction side in the seat width direction than the support bracket 108A positioned on the first direction side in the seat width direction.

The first fixing portion 111 and the second fixing portion 112 respectively comprise the extending portions 111A, 112A provided with the bead portions 111B, 112B. Therefore, rigidity of the first fixing portion 111 and the second fixing portion 112 can be enhanced.

The plate-like portion 113C constituting the extending portion 113A of the third fixing portion 113 comprises the bead portion 113D and the two flange portions 113E. Since rigidity of the third fixing portion 113 can be improved, the lever bracket 109 can be firmly fixed to the seatback frame 101.

The bead portion 113D is provided in the range from the lever bracket 109 to the position corresponding to the support bracket 108A, and the flange portions 113E are provided at least in the range from the position corresponding to the support bracket 108A to the side of the leg portion 113B. Therefore, rigidity of the third fixing portion 113 can be enhanced while avoiding interference between the bead portion 113D and the support bracket 108A.

[Other Embodiments]

The seatback frame 101 according to the above-described third embodiment has a gate-shaped rigid-frame structure by joining the first side frame portion 103 and the second side frame portion 105 with the upper panel portion 107 such as by welding.

The present disclosure is not limited to this. In other words, for example, the first side frame portion 103, the second side frame portion 105 and the upper panel portion 107 may be integrally molded by means of press molding, die casting or the like.

In the above-described third embodiment, the lever bracket 109 is fixed to the seatback frame 101 at the three positions of the first fixing portion 111 to the third fixing portion 113. However, the present disclosure is not limited to this. For example, the lever bracket 109 may be fixed to the seatback frame 101 at four or more positions.

In the above-described third embodiment, welding is mainly used as a fixing method. However, the present disclosure is not limited to this. For example, rivet fixing, fixing with fasteners such as bolts, bonding methods such as by adhesive or brazing, or the like may be used.

The operation lever 210 according to the above-described third embodiment is an operation lever to operate a walk-in mechanism. However, the present disclosure is not limited to this. The operation lever 210 may be an operation lever to operate other mechanisms.

The third fixing portion 113 according to the above-described third embodiment is positioned between the two support brackets 108A, 108B. However, the present disclosure is not limited to this. The support brackets 108A, 108B are not limited to square tubular, but may be cylindrical.

The extending portions 111A to 113A according to the above-described third embodiment are provided with the bead portions 111B, 112B, 113D, respectively. However, the present disclosure is not limited to this. The bead portions 111B, 112B, 113D may not be provided.

The flange portion 113E according to the above-described third embodiment is provided in the range from the position corresponding to the support bracket 108A to the side of the leg portion 113B. However, the present disclosure is not limited to this.

For example, (a) a configuration without the flange portion 113E, (b) a configuration in which the flange portion 113E is provided in the entire extending direction of the plate-like portion 113C, (c) a configuration in which the flange portion 113E is provided only on the first direction side in the width direction of the plate-like portion 113C, or the like may be employed The two side frame portions 103, 105 according to the above-described third embodiment are in panel shape respectively comprising the side surface portions 103A, 105A and the flange portions 103B, 103C, 105B, 105C. However, the present disclosure is not limited to this. For example, the two side frame portions 103, 105 may be configured with a truss-structured pipe.

The conveyance seat according to the above-described third embodiment, is for a car. However, the present disclosure is not limited to this. For example, the conveyance seat can be applied to a conveyance of such as a railroad vehicle, a ship and an airplane.

Also, the present disclosure is not limited to the third embodiments described above as long as it meets the gist of the invention disclosed in the claims. Accordingly, at least two of the plurality of embodiments described above may be combined.

What is claimed is:

1. A conveyance seat provided with a seatback that supports the back of a seat occupant, and an operation lever that is provided on an upper end side of the seatback, the conveyance seat comprising:
    a seatback frame that constitutes the seatback, the seatback frame comprising: two side frames positioned to face each other in a seat width direction and extending in a substantially vertical direction; and an upper panel extending in the seat width direction to join upper end sides of the two side frames and provided with a strip-like panel substantially orthogonal to a seat front-rear direction, the seat front-rear direction being transverse to the seat width direction, the upper panel comprising a generally planar panel shaped frame having a substantially open sectional shape, the upper panel comprising the panel and two surface portions substantially orthogonal to the panel;
    a bracket that is configured to support the operation lever and is fixed to the seatback frame;
    an operation cable that transmits movement due to operation of the operation lever to a mechanism, the operation cable passing through an end portion of the bracket or an end portion of the upper panel, the operation cable being routed outside a space provided between the bracket and the panel from the space; and
    a routing restrictor that is provided at least on one of the bracket and the upper panel and restricts a routing direction of the operation cable.

2. The conveyance seat according to claim 1,
    wherein the routing restrictor restricts the routing direction along at least one of the seat width direction and the vertical direction.

3. The conveyance seat according to claim 2,
    wherein the routing restrictor comprises a first restricting portion that restricts the routing direction along the seat width direction, and a second restricting portion that restricts the routing direction along the vertical direction, and
    wherein the bracket and the upper panel restrict the routing direction of the operation cable in the seat front-rear direction.

4. The conveyance seat according to claim 3,
    the first restricting portion and the second restricting portion each comprise a discrete arm that projects transversely from a base of the routing restrictor, each of the first and second restricting portions extending transversely.

5. The conveyance seat according to claim 3,
    wherein the routing restrictor comprises an extending portion that extends from the end portion of the bracket to a side of the panel.

6. The conveyance seat according to claim 1,
    wherein the operation cable is provided between the upper panel and the routing restrictor in the seat front-rear direction.

7. The conveyance seat according to claim 1, the routing restrictor being spaced from a circumference of the operation cable.

8. A conveyance seat provided with a seatback that supports the back of a seat occupant, and an operation lever that is provided on a first direction side of a seat width direction on an upper end side of the seatback, the conveyance seat comprising:
    a seatback frame that constitutes the seatback, the seatback frame comprising: two side frames positioned to face each other in the seat width direction and extending in a substantially vertical direction; and a panel-like upper panel extending in the seat width direction to join respective upper end sides of the two side frames; and
    a lever bracket that receives an operation force acting on the operation lever, the lever bracket being fixed to the seatback frame at least via a first fixing portion, a second fixing portion, and a third fixing portion,
    the first fixing portion and the second fixing portion being fixed to the first direction side in the seat width direction on the upper end side of the seatback frame, and
    the third fixing portion being fixed to the upper panel and provided closer to a second direction side in the seat width direction than the first fixing portion and the second fixing portion in the upper panel.

9. The conveyance seat according to claim 8,
    wherein the two side frames comprise a first side frame that is provided on the first direction side in the seat width direction, and a second side frame that is provided on the second direction side in the seat width direction,
    wherein the conveyance seat comprises a first joining portion that joins the first side frame and the upper panel, and a second joining portion that joins the second side frame and the upper panel,
    wherein the first fixing portion is provided in the first side frame, and the second fixing portion is provided on the first direction side in the seat width direction of the upper panel.

10. The conveyance seat according to claim 8,
    wherein the upper panel has a panel shape that comprises a first face portion substantially orthogonal to the seat front-rear direction and a second face portion substantially orthogonal to the vertical direction,
    wherein the conveyance seat comprises two support brackets fixed to the upper panel to support a headrest, the two support brackets being spaced apart in the seat width direction, the two support brackets being configured to have a tubular shape that extends in the substantially vertical direction,
    wherein the third fixing portion is positioned between the two support brackets in the first face portion.

11. The conveyance seat according to claim 10,
wherein the third fixing portion comprises an extending portion extending from the lever bracket toward the first face portion, and a leg portion fixed to the first face portion,
wherein the extending portion comprises a substantially plate-shaped plate-like portion, a concave or convex bead portion provided in the plate-like portion, and a flange portion provided at an end portion of the plate-like portion and projecting in a direction substantially orthogonal to the plate-like portion,
wherein the bead portion is provided on a side of the lever bracket, and the flange portion is provided on a side of the leg portion.

12. The conveyance seat according to claim 11,
wherein the bead portion is provided in a range from the lever bracket to positions corresponding to the support brackets,
wherein the flange portion is provided in a range at least from the positions corresponding to the support brackets to the side of the leg portion.

13. The conveyance seat according to claim 11,
wherein at least one of the first fixing portion and the second fixing portion comprises an extending portion extending toward the seatback frame, the extending portion being provided with a concave or convex bead portion.

14. The conveyance seat according to claim 8,
wherein the third fixing portion is positioned so as to overlap with a through-hole provided in a middle portion of the seat width direction of the upper panel.

15. The conveyance seat according to claim 8,
wherein each of the first, second, and third fixing portions being provided on an individual extending portion of the lever bracket and comprises a discrete localized arcuate portion that projects from the respective extending portion of the lever bracket to engage with the seatback frame.

16. The conveyance seat according to claim 8, wherein the third fixing portion is positioned to overlap a through-hole provided at a center, in the seat width direction, of the upper panel.

17. The conveyance seat according to claim 8, each one of the first, second and third fixing portions comprising a discrete flange extending orthogonally from a generally planar body of the lever bracket.

18. A conveyance seat provided with a seatback that supports the back of a seat occupant, and an operation lever that is provided on a first direction side of a seat width direction on an upper end side of the seatback, the conveyance seat comprising:
a seatback frame that constitutes the seatback, the seatback frame comprising: two side frames positioned to face each other in the seat width direction and extending in a substantially vertical direction; and a panel-like upper panel extending in the seat width direction to join respective upper end sides of the two side frames; and
a lever bracket that receives an operation force acting on the operation lever, the lever bracket being fixed to the seatback frame at least via a first fixing portion, a second fixing portion, and a third fixing portion,
the first fixing portion and the second fixing portion being provided on the first direction side in the seat width direction on the upper end side of the seatback frame, and
the third fixing portion being positioned closer to a second direction side in the seat width direction than the first fixing portion and the second fixing portion in the upper panel,
wherein the third fixing portion comprises an extending portion extending from the lever bracket toward a first face portion, and a leg portion fixed to the first face portion, the first face portion extending substantially orthogonal to the seat front-rear direction,
wherein the extending portion comprises a substantially plate-shaped, plate-like portion, a concave or convex bead portion provided in the plate-like portion, and a flange portion provided at an end portion of the plate-like portion and projecting in a direction substantially orthogonal to the plate-like portion,
wherein the bead portion is provided on a side of the lever bracket, and the flange portion is provided on a side of the leg portion.

* * * * *